United States Patent [19]
Takashina et al.

[11] Patent Number: 5,687,145
[45] Date of Patent: Nov. 11, 1997

[54] DISC LOADING APPARATUS FOR DISC RECORDING AND/OR REPRODUCING APPARATUS HAVING ARRANGEMENT WHICH LOWERS DISC ONTO DISC SETTING SURFACE AS IT IS EXTRACTED FROM ARRAY

[75] Inventors: Takeyoshi Takashina; Harumitu Nayuki, both of Chiba, Japan

[73] Assignee: Sony Corporation, Japan

[21] Appl. No.: 525,528

[22] PCT Filed: Jan. 25, 1995

[86] PCT No.: PCT/JP95/00087

§ 371 Date: Sep. 12, 1995

§ 102(e) Date: Sep. 12, 1995

[87] PCT Pub. No.: WO95/20218

PCT Pub. Date: Jul. 27, 1995

[30] Foreign Application Priority Data

Jan. 25, 1994 [JP] Japan ................... 6-023802
Jan. 23, 1995 [JP] Japan ................... 7-027285

[51] Int. Cl.$^6$ ............................... G11B 17/26
[52] U.S. Cl. ............. 369/38; 369/191; 360/98.06
[58] Field of Search ................ 369/38, 191, 192, 369/34, 36, 178, 75.2, 77.1, 77.2; 360/98.04, 98.06

[56] References Cited

U.S. PATENT DOCUMENTS 5,123,001  6/1992  Nakamichi et al. ............... 369/191

FOREIGN PATENT DOCUMENTS 02-260274  10/1990  Japan.
03-3153   1/1991  Japan.
03-222147  10/1991  Japan.

*Primary Examiner*—Stuart S. Levy
*Assistant Examiner*—Kevin M. Watkins
*Attorney, Agent, or Firm*—Ronald P. Kananen

[57] ABSTRACT

A disc recording and/or reproducing apparatus for selectively taking and loading plural discs housed within a housing section on a recording/reproducing section for information recording and/or reproduction is to be reduced in size. The recording and/or reproducing apparatus has a housing section housing plural discs and uplifted or lowered by a lifting mechanism, and a transfer mechanism for selectively taking out discs out of the housing section and for housing the discs taken out in this manner in the housing section. The recording and/or reproducing apparatus also has a main tray movable between a first position protruded out of a main body of the apparatus and a second position housed within the housing section and a recording/reproducing section for information recording and/or reproduction on or from the disc set on the setting portion on the main tray. The distance between the center of the setting portion of the main tray moved to said second position and the center of the disc housed within the housing section is selected to be shorter than the diameter of the disc housed within the housing section. The disc uplifted or lowered by the lifting means relative to the transfer means and the main tray which faces the transfer means is positioned at a position higher in level than the disc setting surface by a pre-set distance.

14 Claims, 22 Drawing Sheets

DISC LOADING APPARATUS FOR DISC RECORDING AND/OR REPRODUCING APPARATUS HAVING ARRANGEMENT WHICH LOWERS DISC ONTO DISC SETTING SURFACE AS IT IS EXTRACTED FROM ARRAY

TECHNICAL FIELD

This invention relates to a recording and/or reproducing apparatus having a disc exchange function. More particularly, it relates to a recording and/or reproducing apparatus having a housing section capable of housing a plurality of discs within its main body and which selectively takes out a disc from the housing section and loads the disc onto its recording/reproducing section for information recording or reproduction. The invention also relates to a disc loading mechanism employed in such apparatus.

BACKGROUND ART

There has hitherto been employed a disc recording and/or reproducing apparatus having a disc exchange function in which a plurality of discs housed within its housing section provided within its main body may be selectively taken out (extracted) and loaded on its recording/reproducing section for information recording and/or reproduction.

In this type of the disc recording/reproducing apparatus having the disc exchange function, there has been proposed an arrangement having a housing section 10 for holding plural discs 1 in tiers at a constant interval from one another and with the surfaces of adjacent discs facing each other, as shown in FIG. 32. In this disc recording/reproducing apparatus, a disc tray 3 is placed facing an opening of the housing section 2 so that the discs 1 selectively taken out from the housing section 10 by a disc transfer unit, not shown, will be set thereon. The upper surface of the disc tray 3 is formed with a recessed disc setting portion 4 on which a disc 1, which is pulled out of the housing section 10, is set. The bottom side of the disc setting portion 4 is formed with an aperture 6. A disc table 5 on which the disc 1 set on the disc setting portion 4, is loaded and which constitutes a disc rotating driving unit for rotationally driving the disc 1, is intruded into the aperture 6. An optical pickup for recording/ reproducing the information on or from the disc 1 driven by the disc table 5, faces the disc through the aperture 6.

The recording/reproducing unit, inclusive of the housing section 10 and the disc table 5, is supported for movement in a vertical direction perpendicular to the surface of the disc 1 housed within the housing section 10. In order to load a disc 1 housed within the housing section 10 for information recording and/or reproduction, the housing section 10 is moved in a direction perpendicular to the disc surface as shown by arrow Y in FIG. 32 until a disc supporting surface 7a of a supporting groove 7, in which the disc 1 to be loaded on the disc table 5 is inserted and supported, coincides with a disc setting surface 4a of the disc setting portion 4 formed in the disc tray 3. A disc transfer unit, not shown, is then actuated to pull out the disc 1 out of the housing section 10 in the horizontal direction as shown by arrow X in FIG. 33 and to set the disc 1 on the disc setting portion 4 of the disc tray 3.

The recording/reproducing section, inclusive of the disc table 5, is then moved vertically as indicated by arrow Z in FIG. 34 so that the disc table 5 extends, via the aperture 6, into the interior of the disc tray 3. When the disc table 5 is intruded into the inside of the disc tray 3, the disc 1 is lifted slightly above the disc setting surface 4a of the disc setting portion 4, so that it is set on the disc table 5 and can be freely rotated without contact with the disc setting surface 4a. A disc clamper, not shown, provided facing the disc table 5, is pressed against the top of the disc 1 for unifying the disc 1 with the disc table 5.

During operation, the disc 1 is rotated in unison with the disc table 5 along with the clamper. The optical pickup unit is fed radially along the disc 1, while the disc 1 is being rotated, for recording/reproducing the information on or from the disc 1.

With the above-described disc recording/reproducing apparatus, the disc 1 loaded on the disc table 5 is configured to be loaded on the disc table 5 in such a manner that the disc to be loaded 1 is not completely pulled out from between the other discs 1 housed within the housing section 10, but is partially overlapped therewith for reducing the size of the disc recording and/or reproducing apparatus. That is, disc tray 3 in this apparatus is arranged so that the disc 1 housed within the housing section 10 may be loaded on the disc table 1 by being pulled out at its central portion inclusive of a center aperture. The disc tray 3 is arranged in proximity to the housing section 10 so that the side thereof facing the housing section 10 is opened and partially overlapped with the discs 1 housed within the housing section 10. The disc pull-out length out of the housing section 10 may be reduced by arranging the disc tray 3 in this manner, so that the disc pull-out length from the housing section 10 may be diminished for reducing the size of the apparatus.

Meanwhile, in such disc recording/reproducing apparatus, the disc 1 pulled out and set on the disc tray 3 needs to be rotated in a stable state without being unduly loaded or damaged when the disc 1 is loaded on the disc tray 5 and subsequently rotated. Thus, the disc 1 pulled out of the housing section 10 is loaded on the disc table 5 in a state of being floated from the disc setting portion 4 so as to be free from contact with the disc setting surface 4a during its rotation. In addition, the disc 1 needs to be loaded on the disc table 5 so as to be free from contact with other discs 1 housed within the housing section 10.

In order that the disc 1, thus extracted from the housing section 10 while remaining partially overlapped with other discs 1 housed within the housing section 10, can be loaded on the disc table 5 and rotated thereon while being supported above the disc setting portion 4 without contact therewith, a large distance d has to be provided between neighboring discs 1 housed within the housing section 10. That is, it is necessary to make the distance d large enough to permit rotation of the disc 1 loaded on the disc table 5 in a state of being supported above the disc setting portion 4 without being contacted with other discs 1.

However, if the distance d between the neighboring discs 1 housed within the housing section 10 is increased, the height of the housing section 10 is increased, with the result that the disc recording and/or reproducing apparatus, associated with the housing section 10, is also increased in size.

SUMMARY OF THE INVENTION

It is therefore an object of the present invention to provide a disc recording and/or reproducing apparatus whereby the housing section housing plural discs therein may be reduced in size for thereby reducing the size of the disc recording and/or reproducing apparatus provided with the housing section.

It is another object of the present invention to provide a disc recording and/or reproducing apparatus capable of housing a large number of discs without enlarging the size of the apparatus.

It is a further object of the present invention to provide a disc recording and/or reproducing apparatus capable of realizing stable disc rotation while reducing the pull-out length of the disc from the housing section.

It is a further object of the present invention to provide a disc recording and/or reproducing apparatus capable of exchanging the discs housed within the housing section with ones outside the apparatus.

It is yet another object of the present invention to provide a disc recording and/or reproducing apparatus in which the disc loading unit for pulling out a disc housed within the housing section and for loading the pulled-out (Extracted) disc on the recording/reproducing section may be reduced in size for thereby reducing the size of the disc recording and/or reproducing apparatus employing the loading unit.

DISCLOSURE OF THE INVENTION

A disc recording and/or reproducing apparatus according to the present invention has a housing section housing a plurality of discs in a spaced relation with the disc surfaces facing one another. The housing section is arranged within a main body of the apparatus so as to be vertically moved, by lifting means, in a direction substantially perpendicular to the disc surfaces. The apparatus also has transfer means movable in a direction parallel to the surfaces of the discs housed within the housing section for selectively taking out (extracting) a selected disc from among the discs housed within the housing section and for housing the extracted disc in the housing section, and a main tray having a setting portion on which to set the disc taken out of the housing section by the transfer means. The main tray is movable in a direction parallel to the surfaces of the discs housed within the housing section between a first position protruded from the main body of the apparatus and a second position wherein it is housed within the main body of the apparatus. The apparatus also has a recording and/or reproducing section for recording and/or reproducing the information on or from the disc set on the setting portion of the main tray while it is in the second position.

The distance between the center of the setting portion of the main tray in the second position and the center of the disc housed within the housing section, is selected to be shorter than the diameter of the discs housed. The discs housed within the housing section which are raised or lowered by the lifting means relative to the transfer means, and the main tray, which faces the transfer means, is arranged at a position which is higher, by a pre-set distance, than the disc setting surface of the setting portion.

The transfer means has a transfer section for transferring the disc facing the transfer means towards the setting portion of the main tray, and a guide portion for guiding the disc transferred by the transfer section. The guide portion includes an inclined portion interconnecting the disc facing the transfer section and the setting portion.

The transfer section is mounted for movement in a direction parallel to the surface of the discs housed within the housing section between a take-out position of taking out the disc housed within the housing section onto the main tray and a transfer position to which the disc, taken out from the housing section, is to be transferred.

There is provided movement means for moving the recording/reproducing section between a recording/reproducing position for recording and/or reproducing the information on or from the disc and position lower in level than the recording and/or reproducing position.

There are provided a sole driving source and switching means for selectively switching and transmitting the driving power of said sole driving source to the lifting means or the movement means.

A disc loading mechanism according to the present invention has a housing section housing a plurality of discs in a spaced parallel relation. The housing section is arranged within a main body of the apparatus so as to be vertically moved by lifting means in a direction substantially perpendicular to the disc surfaces. The disc loading mechanism also has transfer means movable in a direction parallel to the surfaces of the discs for selectively taking out or extracting a selected disc from among the discs housed within the housing section and for housing (reinserting) the taken-out disc into the housing section. The disc loading mechanism further includes a main tray having a setting portion on which to set the extracted disc. The main tray is movable in a direction parallel to the surfaces of the discs housed within the housing section between a first position protruded from the main body of the apparatus and a second position housed within the main body of the apparatus. The disc among those housed within the housing section raised or lowered by the lifting means relative to the transfer means and the main tray which faces the transfer means is positioned higher by a pre-set distance, than the disc setting surface of the setting portion.

With the present disc recording and/or reproducing apparatus, the lifting mechanism is actuated for uplifting (raising) and lowering the housing section housing plural discs therein for aligning one of the discs housed within the housing section with the setting portion of the main tray for facing the disc to the transfer mechanism. The transfer mechanism is then actuated for taking out the disc facing the main tray from the housing section and for setting the taken-out disc on the setting portion of the main tray. The disc set on the setting portion is loaded on the disc table provided on the recording and/or reproducing section. The disc is lifted from the main tray and rotated with the disc table without contacting the main tray or other discs. An optical pickup is moved along the radius of the disc for recording and/or reproducing the information on or from the disc.

With the present disc recording and/or reproducing apparatus, the disc among those housed within the housing section moved relative to the transfer mechanism and the main tray by the lifting mechanism which faces the transfer mechanism is offset a pre-set distance from the setting portion of the main tray in the upward direction. Thus, the disc when taken out by the transfer mechanism and set on the setting portion is moved in the downward direction a distance corresponding to such pre-set distance. Thus, the disc set on the setting portion is raised therefrom, thereby avoiding contact with the setting portion when the disc is loaded and run in rotation on the disc table. The disc is separated from the setting portion by being lifted a distance equal to the aforementioned pre-set distance. In addition, the this extracted disc is prevented from contacting the disc disposed directly thereabove.

Consequently, even if the housing section and the main tray are disposed in proximity to each other at a distance shorter than the disc diameter such that the disc housed within the housing section is partially overlapped in the vertical direction with the disc positioned on the main tray and loaded on the disc table, it is possible to avoid direct contact between these discs. The vertical distance between the discs housed within the housing section may be reduced by an offset between the pulled out disc and the setting portion of the main tray for correspondingly reducing the height of the apparatus.

In addition, since the disc taken out of the housing section so as to be transferred towards the setting portion of the main tray is transferred as it is guided by the inclined portion interconnecting the setting portion and the disc housed within the housing section for facing the transfer mechanism provided in the guide portion, it may be moved in stability while it is deviated in its vertical position.

Furthermore, the driving power of the driving source may be reduced since the movement mechanism for moving the recording and/or reproducing section and the lifting mechanism uplifting and lowering the housing section is driven by the driving power from the sole driving source which is selectively switched by a switching mechanism.

DETAILED DESCRIPTION OF THE PREFERRED EMBODIMENTS

Figure 1:
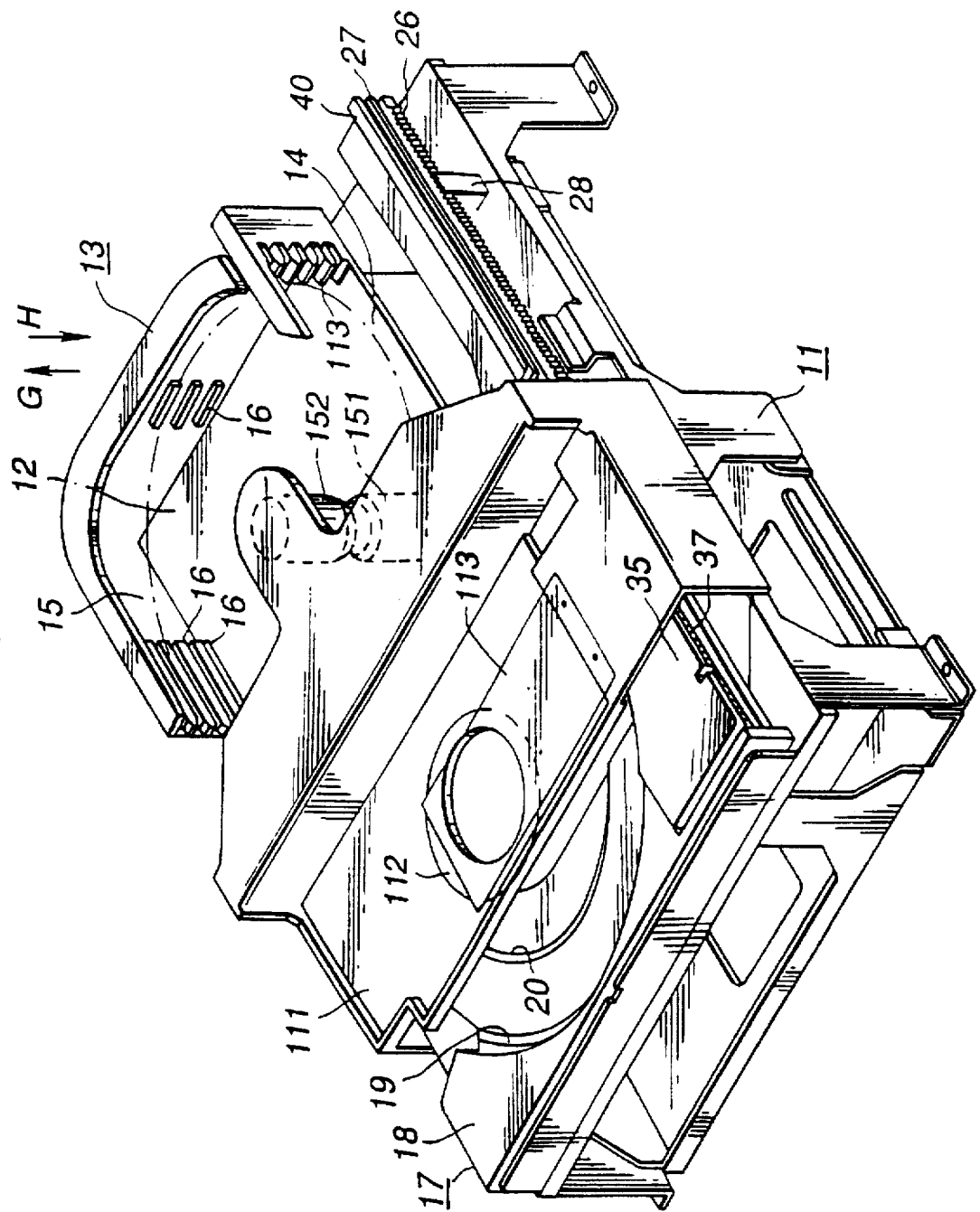
FIG. 1 is a perspective view of a disc recording and/or reproducing apparatus according to the present invention.
Figure 2:
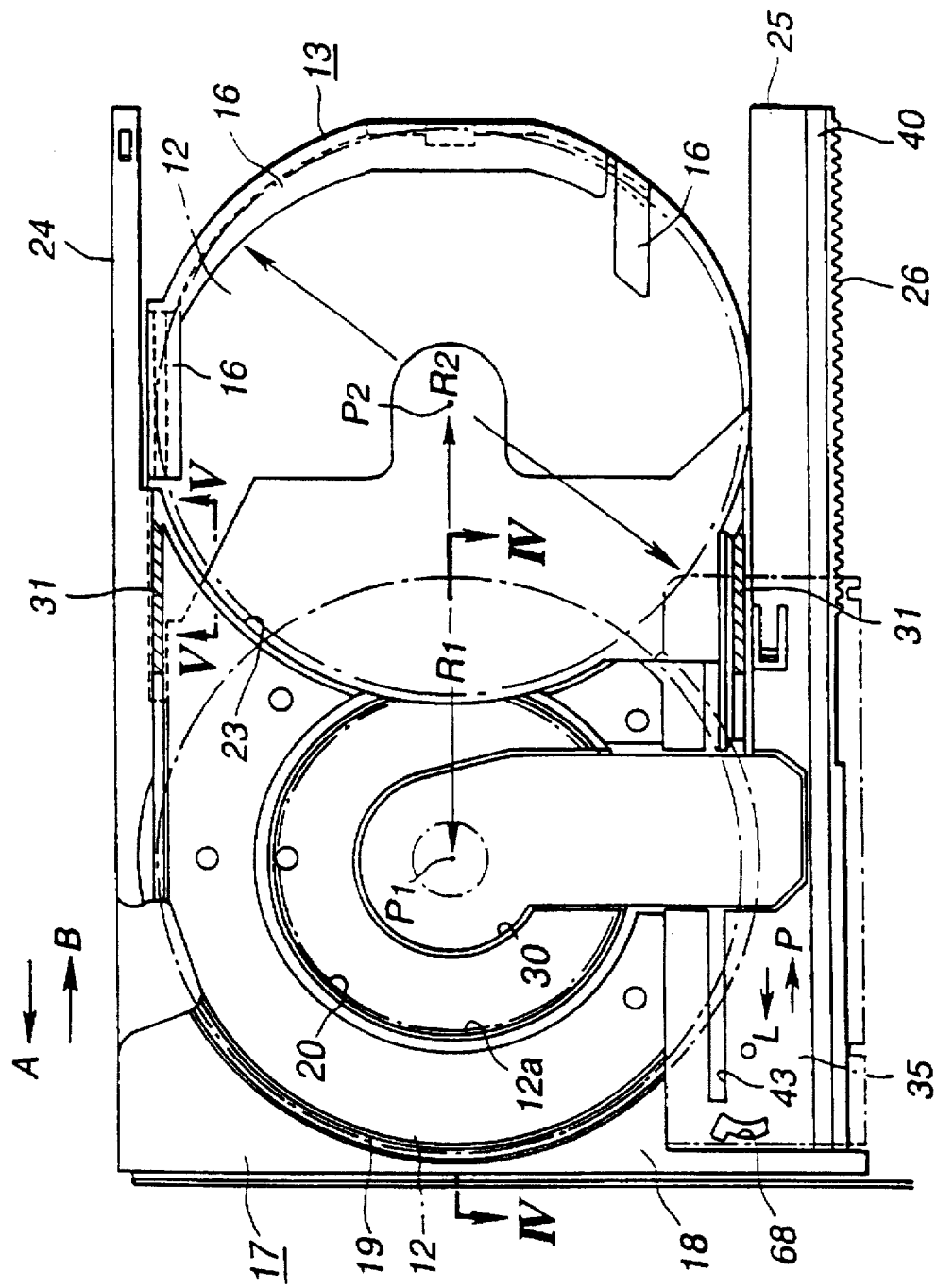
FIG. 2 is a plan view showing a main tray and a housing section making up the disc recording and/or reproducing apparatus shown in FIG. 1.

Referring to the drawings, preferred illustrative embodiments of the present invention will be explained in detail. A disc recording and/or reproducing apparatus of the present embodiment has a chassis 11 arranged within an outer casing for constituting a main body of the apparatus, as shown in FIG. 1. At a rear side within an interior of the outer casing of the chassis 11 is a housing section 13 within which a number of optical discs 12 as recording media for the disc recording and/or reproducing apparatus are housed. The housing section 13 has a substantially U-shaped upstanding peripheral wall 15 extending over opposite lateral sides and a rear side of a bottom plate 14, as shown in FIGS. 1 and 2. That is, the housing section 13 is formed as a casing opened on its front side corresponding to the front side of the outer casing. On the inner peripheral side of the upstanding peripheral wall 15 are protuberantly formed plural disc supporting pieces 16 which are parallel to and equally spaced apart from one another along the height of the upstanding peripheral wall 15. The optical discs 12 have their outer periphery carried by the disc supporting pieces 16 and are housed within the housing section 13 in tiers so that the discs are spaced apart from one another and with the surfaces of the neighboring discs facing each other.

The housing section 13 is uplifted and lowered in a direction perpendicular to the disc surfaces of the optical discs 12 housed therein by a lifting mechanism as later explained.

Figure 3:
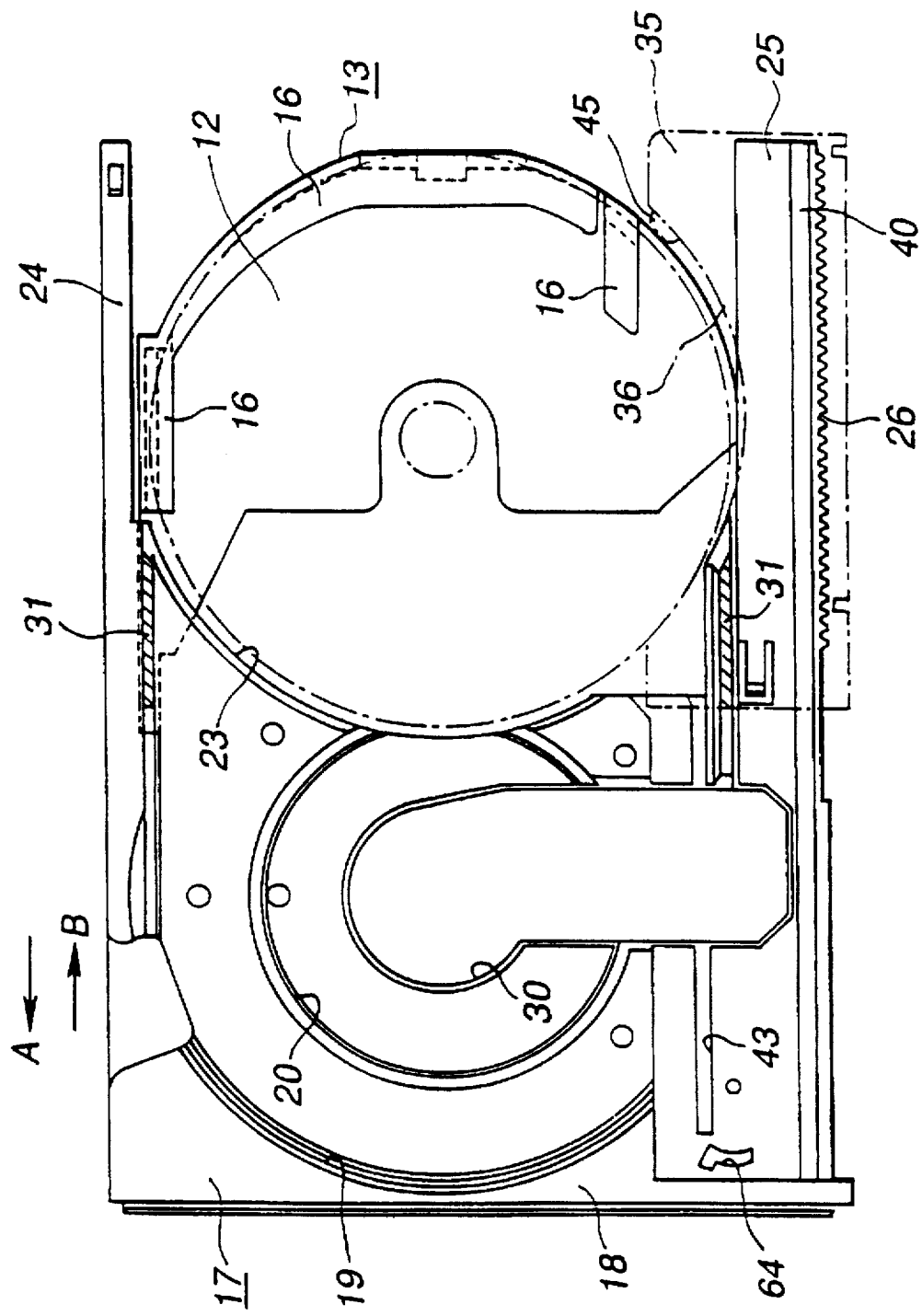
FIG. 3 is a plan view showing the relation between the main tray and the housing section with the transfer section having been moved to the housing position.
Figure 8:
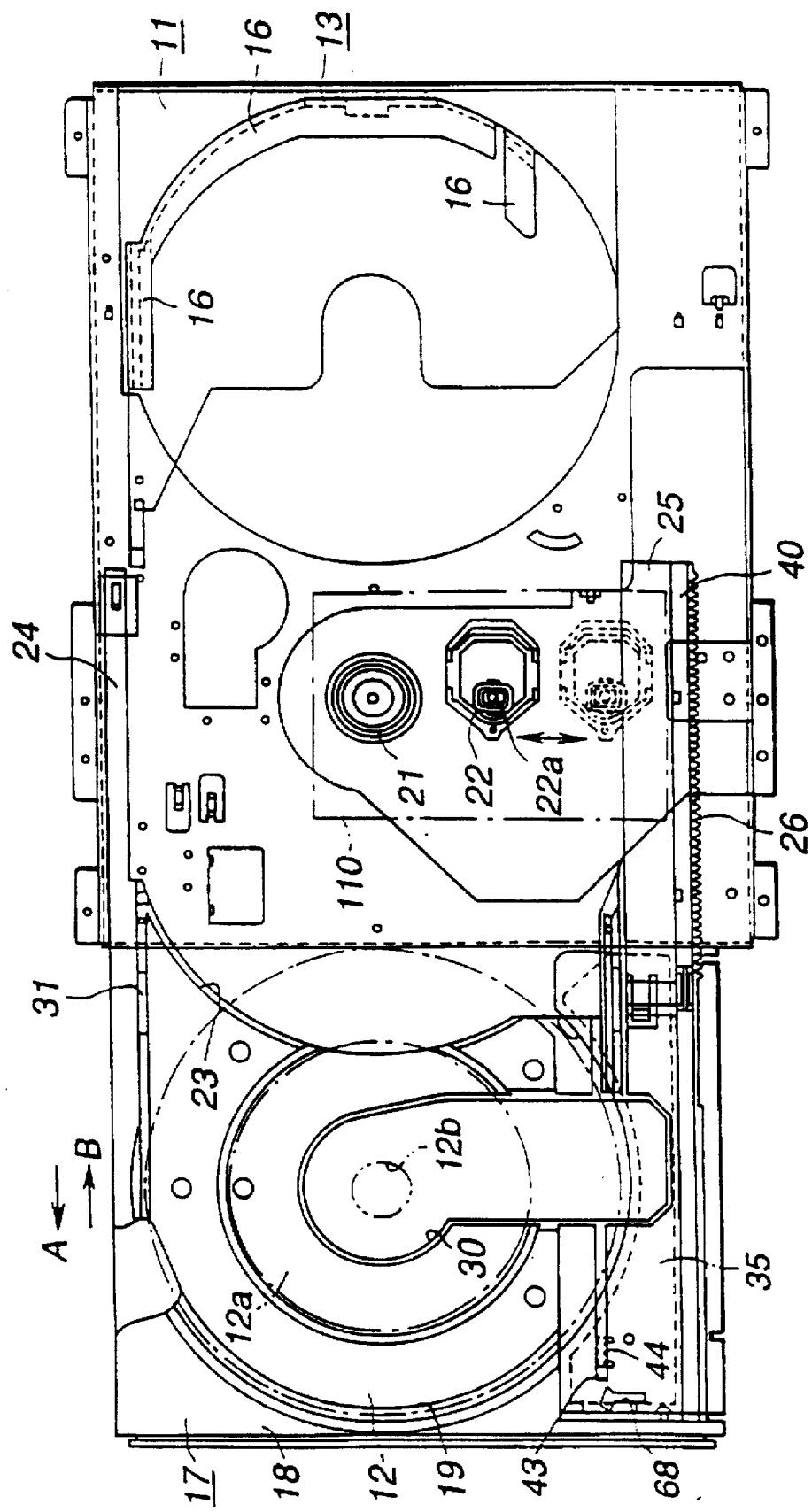
FIG. 8 is a plan view of the disc recording and/or reproducing apparatus with the main tray having been moved to a first position in which the main tray is protruded out of a main body of the apparatus.

On the chassis 11 is arranged a main tray 17 for facing the housing section 13, as shown in FIG. 2 and 3. On the main tray 17 is set an optical disc 12 taken out of the housing section 13. The main tray 17 is arranged on the chassis 11 for movement in directions parallel to the surface of the optical disc 12 housed within the housing section 13, as indicated by arrows A and B in FIG. 2, between a first position in which the main tray is protruded out of the main body as shown in FIG. 8 and a second position in which the disc tray is housed within the main body and the information recording and/or reproduction is performed on or from the optical disc 12 proximate to the housing section 13, as shown in FIG. 2.

Figure 4:
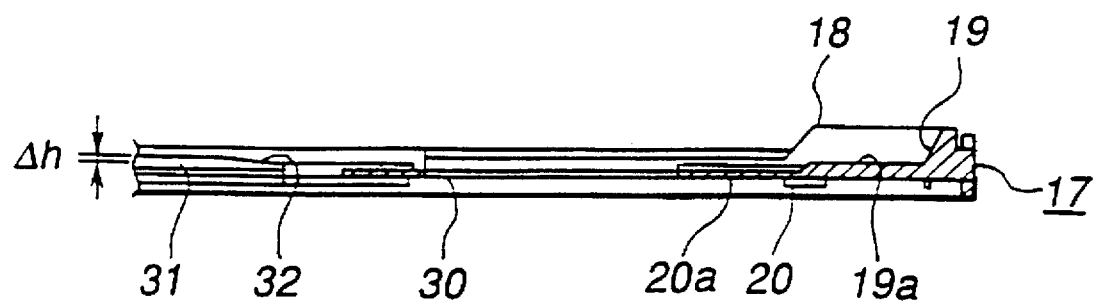
FIG. 4 is a cross-sectional view taken along line IV—IV of FIG. 2.
Figure 5:
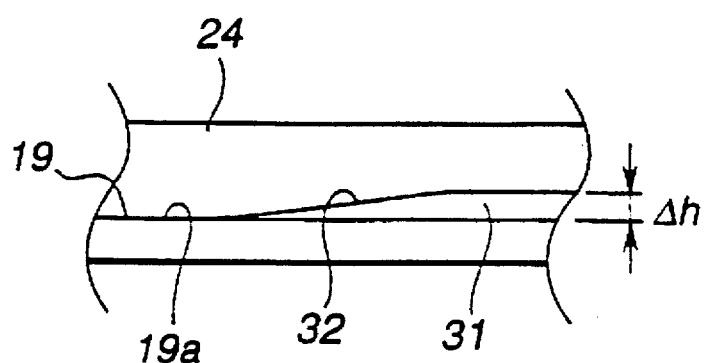
FIG. 5 is a cross-sectional view taken along line V—V of FIG. 2.

The main tray 17 has a rectangular-shaped planar tray main member 18 having at a central portion on its upper major surface a cupped circular first setting portion 19 for the optical disc 12, as shown in FIGS. 2 and 3. The first setting portion 19 is large enough in size to set the optical disc 12 having a diameter of 12 cm in position therein. Within the first setting portion 19 is formed a second setting portion 20 concentrically with the first setting portion 19. The second setting portion 20 is cupped further from the bottom surface of the first setting portion 19 and is sized so as to be large enough to hold an optical disc 12a having a diameter of 8 cm therein in position. That is, the second setting portion 20 has a disc setting surface 20a which is at a lower position than a disc setting surface 19a of the first disc setting portion 19, as shown in FIG. 4.

Figure 9:
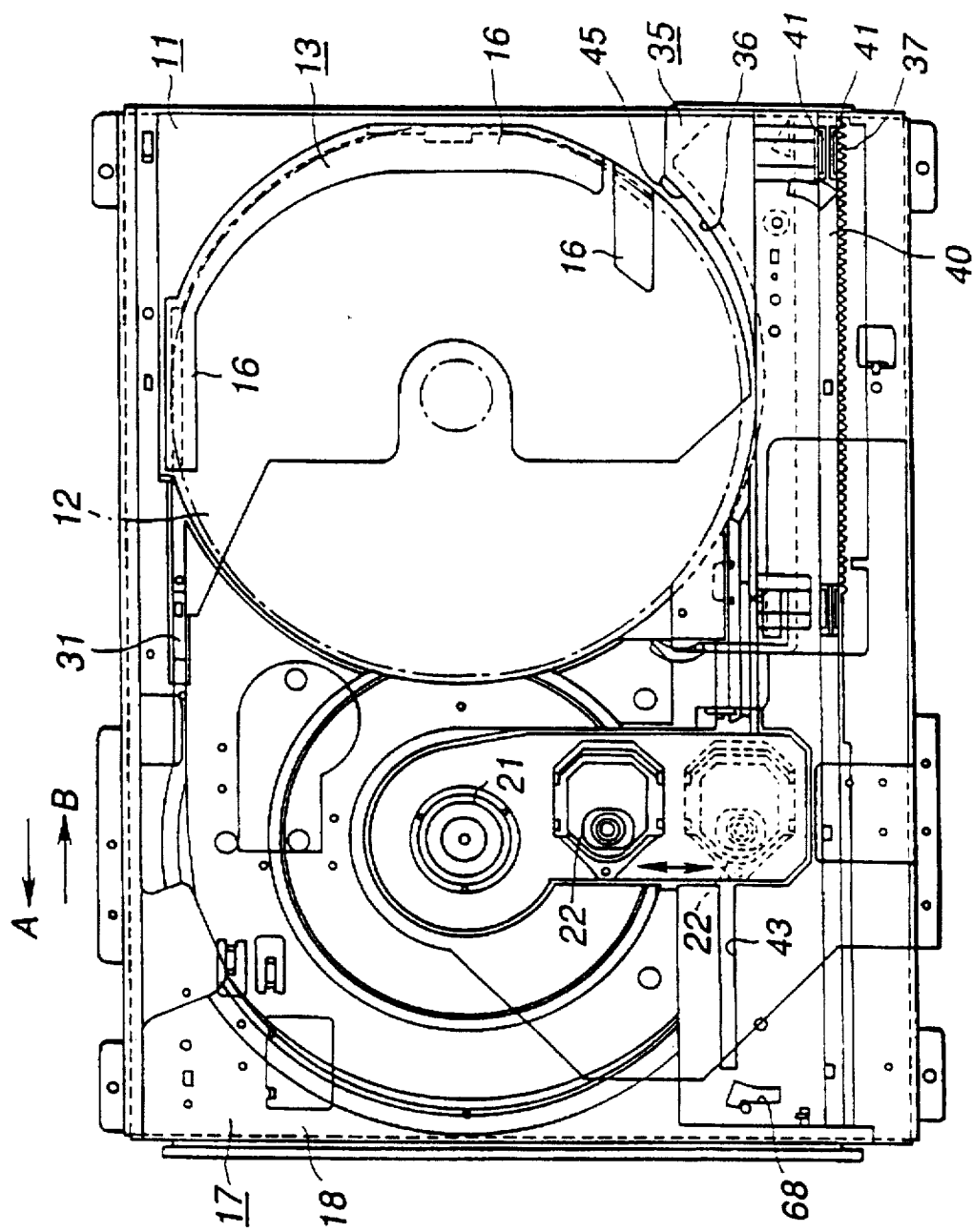
FIG. 9 is a plan view of the disc recording and/or reproducing apparatus with the main tray having been moved to a second position in which the main tray is housed within a main body of the apparatus.

An aperture 30 is formed for extending from the central portion on the bottom sides of the first and second setting portions 19, 20 to the vicinity of a lateral side of the tray main member 18 running parallel to the direction of movement of the main tray 17. The portion of the aperture 30 in register with the mid-portion on the bottom sides of the first and second setting portions 19 and 20 is a region into which may be intruded a disc table 21 of a disc rotating driving mechanism of the recording/reproducing section configured to run one of the optical disc 12 having the diameter of 12 cm or the optical disc 12a having the diameter of 8 cm in rotation, as shown in FIGS. 8 and 9. The portion of the aperture 30 extending from the mid portions of the bottom sides of the first and second setting portions 19 and 20 to the vicinity of a lateral side of the tray main member 18 is a region facing an objective lens 22a of an optical pickup 22 of the recording/reproducing section configured to be moved along the radius of the optical disc 12 or 12a which is loaded and rotated on the disc table 21.

The rear side of the tray main member 18 facing the housing section 13 is formed with a cut-out 23 into which a portion of the optical disc 12 housed within the housing section 13 is intruded when the main tray 17 is moved to the second position in which the main tray 17 is housed within the main body of the apparatus, as shown in FIG. 2.

On both lateral sides towards the rear side of the tray main member 18 are formed first and second slide arms 24, 25 parallel to and facing each other.

The main tray 17 is arranged on the chassis 11 for movement in directions indicated by arrows A and B in FIG. 2 so that the first and second slide arms 24, 25 are extended on both lateral sides of the housing section 13. When the main tray 17 is at the second position proximate to the housing section 13, the distance $R_1$ between the common center $P_1$ of the first and second setting portions 19, 20 and the center $P_2$ of the optical disc 12 housed within the housing section 13 is shorter than the diameter $R_2$ of the optical disc 12 housed within the housing section 13. Thus, when the main tray 17 is at the second position proximate to the housing section 13 as shown in FIG. 2, part of the optical disc 12 within the housing section 13 facing the main tray 17 is intruded into the cut-out 23 so as to be overlapped with a portion of the optical disc 12 set on the first setting portion 19.

On the outer lateral surface of the second slide arm 25 of the main tray 17 is formed a rack gear 26 to which is transmitted a driving power of a tray movement mechanism adapted to shift the main tray 17 in directions shown by arrows A or B in FIG. 2, as will be explained subsequently.

On the outer lateral sides of the main tray 17 are formed slide guide grooves 27 for extending from the tray main member 18 as far as the first and second slide arms 24, 25. These slide guide grooves 27 are engaged by slide guide pieces 28 provided on the chassis 11 and on a member provided on the chassis 11. The main tray 17 is supported on the chassis 11 for movement parallel to the surface of the optical disc 11 housed within the section 13 by being guided by the slide guide piece 28 so as to be safeguarded against floating from the chassis 11.

On mutually facing surfaces of the first and second slide arms 24, 25 provided on the main tray 17, by which the slide arms 24, 25 are connected to the tray main member 18, guide portions 31, 31 are provided for supporting the optical disc 12 moved between the housing section 13 and the first setting portion 19 for guiding its movement as shown in FIGS. 2 to 4. Since these guide portions 31, 31 guide the optical disc 12 between the housing section 13 and the first setting portion 19 in stability, the guide portions are preferably mounted for facing the portion of the disc 12 housed in the housing section 13 which is protruded towards the tray main member 18 when the main tray 17 is at the second position proximate to the housing section 13 as shown in FIG. 2.

The rear ends of the guide portions 31, 31 which are proximate the housing section 13, are at a location Ah higher than the disc setting surface 19a of the first disc setting portion 19. The upper surfaces of the guide portions 31, 31 on which the optical disc 12 is moved include inclined surface portions 32 having a gradual downward gradient from the rear ends thereof towards the disc setting surface 19a of the first setting portion 19. Thus, the optical disc 12 is pulled out of the housing section 13 at a position at least higher by the maximum height Δh than the disc setting surface 19a.

These guide portions 31, 31 form a part of a transfer mechanism for the optical disc 12 in conjunction with a transfer section 35 for the optical disc 12 provided on the upper surface of the main tray 17 provided with the second slide arm 25 for movement parallel to the direction of movement of the main tray 17.

The transfer section 35 of the transfer mechanism is configured to move the optical disc 12 between the housing section 13 and the first setting portion 19 of the main tray 17 which is accommodated in the main body of the apparatus and which is at the second position of recording or reproducing the information on or from the optical disc 12 or 12a.

The transfer section 35 is arranged on the main tray 17 for movement in directions shown by arrows C and D in FIGS. 2 and 3 between the position at the front side end of the main tray 17 for taking out the optical disc 12 as shown in FIG. 2 and the position towards the housing section 13 for housing the optical disc 12 therein as shown in FIG. 3.

Figure 6:
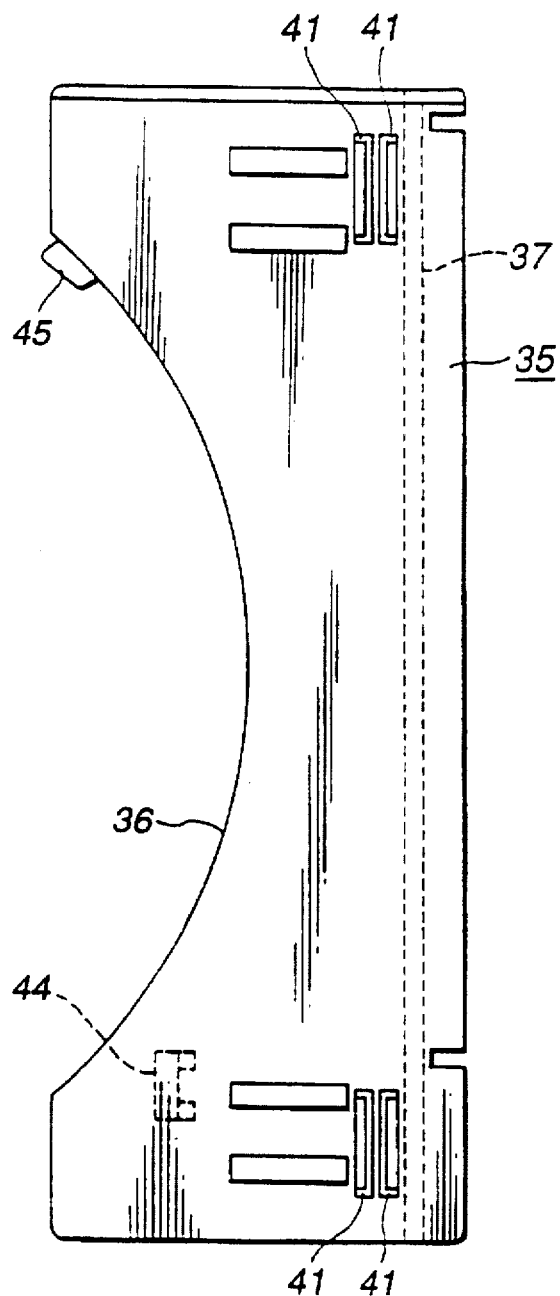
FIG. 6 is a plan view of the transfer section.
Figure 7:
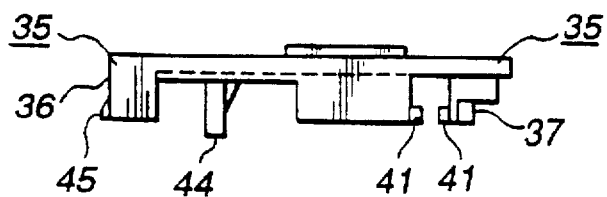
FIG. 7 is a side view of the transfer section.

The transfer section 35 is formed on its side facing the housing section 13 and the first and second setting portions 19, 20 with an arcuate disc guide portion corresponding to the outer shape of the optical disc 12 housed within the housing section 13 as shown in FIGS. 6 and 7. The disc guide portion 36 is formed on the side of the transfer section 35 facing the first and second setting portions 19, 20 and the housing section 13 when the transfer section is arranged on the main tray 17. On the opposite side of the transfer section to the disc guide portion 36 is formed a second rack gear 37 extending along the direction of movement of the transfer section 35. The second rack gear 37 has the same tooth pitch as that of the first rack gear 26 formed on the main tray 17. When the transfer section 35 mounted for superimposition with the main tray 17 is moved on the main tray 17 so as to be positioned towards the housing position, the second rack gear 37 of the transfer section 5 has its crests and recesses in register with those of the first rack gear 26 of the main tray 17. The first and second rack gears 26, 37 in such position are engaged by a common pinion gear constituting a tray movement mechanism.

On the lower surface of the transfer section 35, that is the surface of the transfer section facing the upper surface of the main tray 17 when the transfer section is arranged on the main tray 17, two pairs of engagement pawls 41, 41 are formed for engaging with the upper end of a guide rail 40 formed on the main tray 17 from both lateral sides. By the sets of the engagement pawls 41, 41 being engaged with the guide rail 40, the transfer member 35 is mounted on the main tray 17 in a manner free from detachment of the main tray 17 towards the upper side and is movable in directions indicated by arrows C and D in FIG. 3 by being guided by the guide rail 40. On the lower surface of the transfer section 35 is formed a slide guide piece 44 engaged in a slide guide groove 43 formed in the upper surface of the main tray 17. That is, the transfer section 35, mounted on the main tray 17 by the engagement pawls 41 engaged in the guide rail 40 and by the slide guide piece 44 engaged in the slide guide groove 43, is movable along a straight path in the fore-and-aft direction of the main tray 17.

On the rear side towards the housing section 13 of the disc guide portion 36 formed in the transfer section 35 is formed a supporting lug 45 configured to support a portion of the optical disc 12 transferred by the transfer section 35, as shown in FIGS. 6 and 7.

Figure 10:
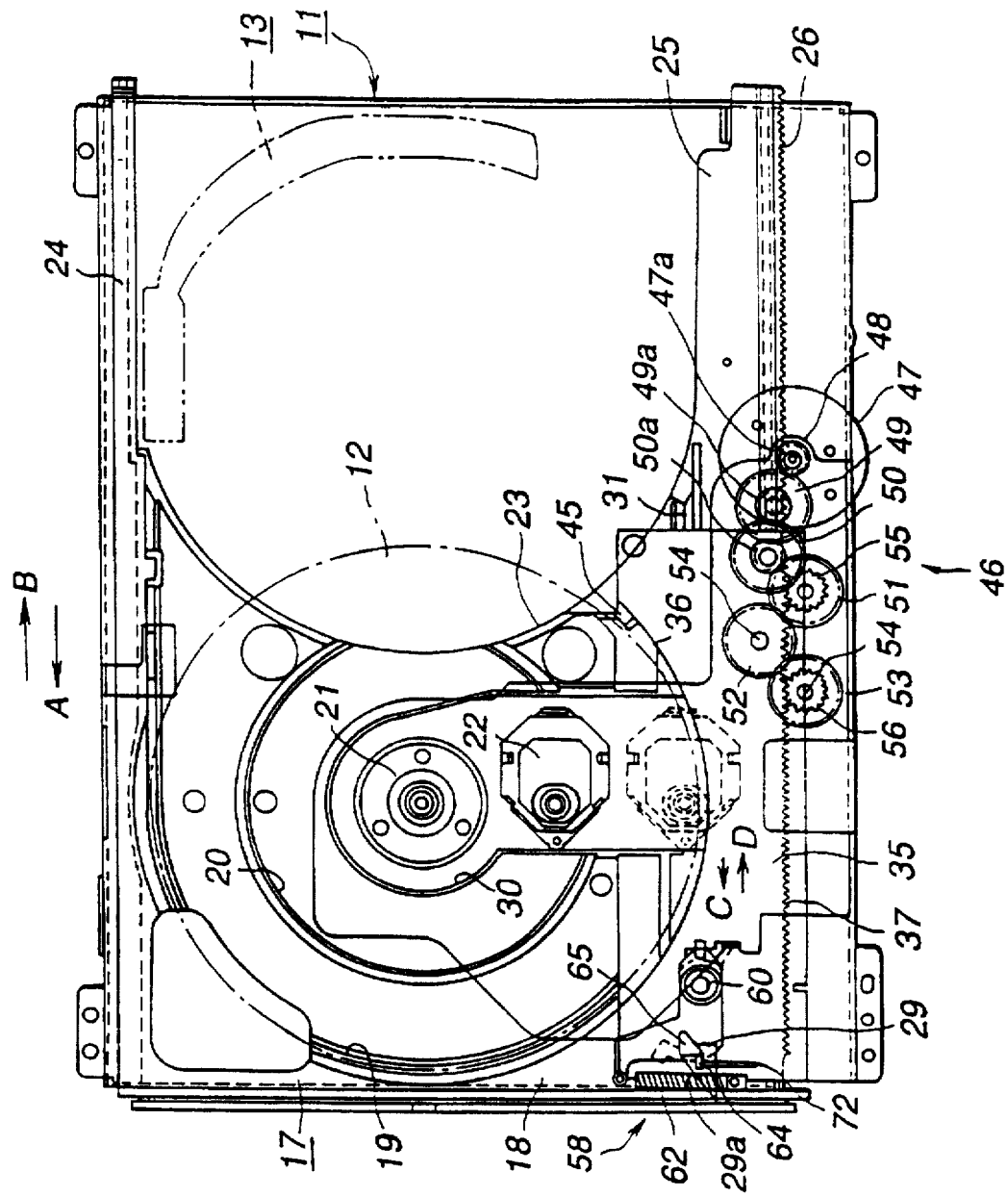
FIG. 10 is a plan view of the disc recording and/or reproducing apparatus for illustrating a tray transfer mechanism.
Figure 11:
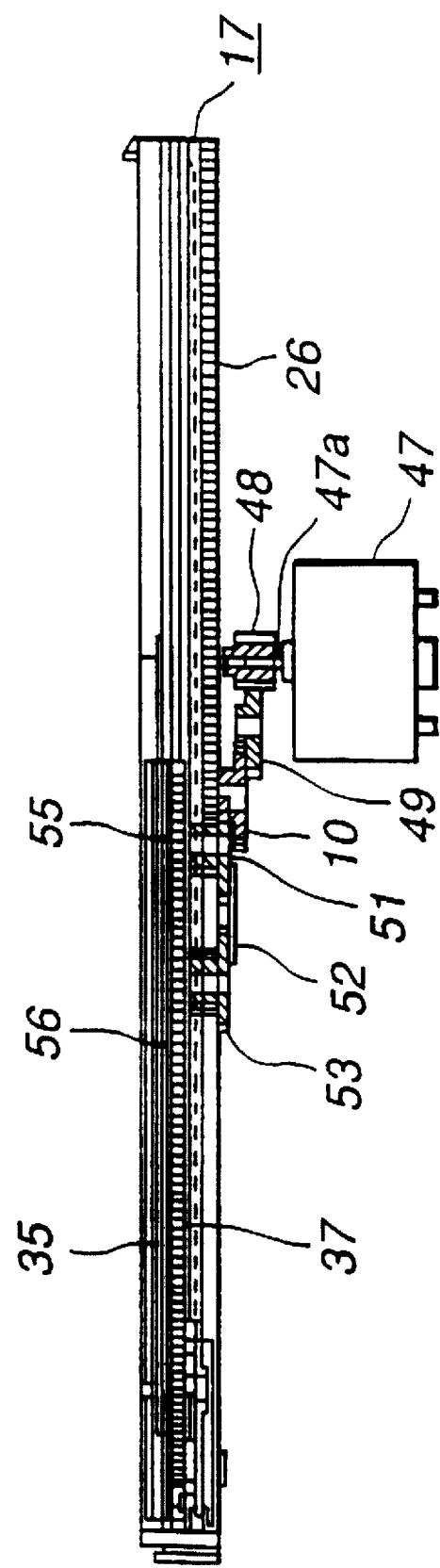
FIG. 11 is a cross-sectional side view of the disc recording and/or reproducing apparatus for illustrating a tray transfer mechanism.

The transfer section 35, constituting a transfer mechanism for the main tray 17 movably mounted on the chassis 11 and the optical disc 12 movably mounted on the main tray 17, is moved by a tray movement mechanism 46 provided on the chassis 11. The tray movement mechanism 46 is made up of a driving motor 47 mounted on the chassis 11 and a gearing for transmitting the driving power of the driving motor 47 to the main tray 17 and the transfer section 35, as shown in FIGS. 10 and 11. The component parts of the gearing include a driving gear 48 mounted on an output shaft 47a of the driving motor 47, a first driving gear 49 meshing with the driving gear 48, a second gear 50 meshing with a small driving power transmitting gear 49a coaxial with the first gear 49, a third gear 51 meshing with a small driving power transmitting gear 50a coaxial with the second gear 50, a fourth gear 52 meshing with the third gear 51 and a fifth gear 55 meshing with the fourth gear 52.

The first to fifth gears 49 to 53 are rotatably carried by a supporting shaft 54 mounted on the chassis 11.

On the upper ends of the third gear 51 and the fifth gear 53 are formed first and second pinions 55, 56 coaxially with the gears 51 and 53, respectively. These first and second pinion gears 55, 56 are engaged simultaneously or selectively with the first rack gear 26 provided on the main tray 17 and with the second rack gear 37 provided on the transfer section 37, respectively.

The main tray 17, moved by the above-described tray movement, mechanism 46, is provided with a main tray positioning mechanism 58 which, when the main tray 17 has been moved to the second position in which the main tray 17 is housed within the main body of the apparatus, is engaged with a retention lug 29 provided on the chassis 1 for positioning and locking the main tray 17 in the second position. The main tray positioning mechanism 58 is provided at a forward portion of the side of the lower surface of the main tray 17 formed with the first rack gear 26. The main tray positioning mechanism 58 is made up of a substantially L-shaped engagement plate 61 and a tension spring 62 for biasing the engagement plate 61 into rotation about a pivot 60 as the center of rotation. The engagement plate 61 has its pivot 60 mounted in a bearing hole 59 formed in the lower surface of the main tray 17.

Figure 12:
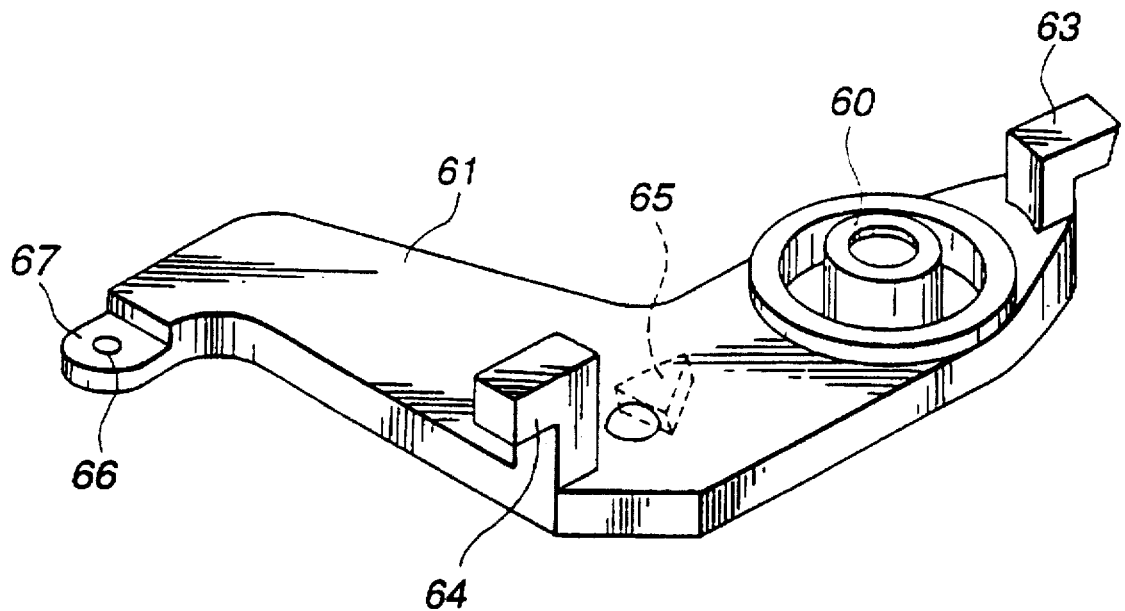
FIG. 12 is a perspective view showing an engagement plate constituting a main tray positioning mechanism.

The engagement plate 61, constituting the main tray positioning mechanism 58, is substantially L-shaped, and has the tubular pivot 60 inserted in the bearing hole 59 formed in the lower surface of the main tray 17 and an L-shaped first engagement protrusion 63 at its distal end, as shown in FIG. 12. There is also provided a second engagement protrusion 64 engaged with and disengaged from an engagement portion of the transfer section 35 as later explained. The second engagement protrusion 64 is provided at a mid-portion of the engagement plate on the opposite side of the pivot 60 with respect to the first engagement protrusion 63. The second engagement protrusion 64 is L-shaped, similarly to the first engagement protrusion 63. On the surface of the engagement plate 61 opposite to its surface provided with the engagement protrusions 63, 64 is formed an engagement/disengagement piece 65 configured to be engaged with and disengaged from the cam plate 29 provided on the chassis 11. The engagement/disengagement piece 65 is positioned between the pivot 60 and the second engagement protrusion 64 on the opposite surface of the engagement plate 61, as shown in FIG. 12. On the distal end of the opposite end portion of the engagement plate 61 is formed a spring retention piece 67 having a spring retention hole 66 configured for retaining one end of the tension spring 62.

The above-described engagement plate 61 is supported for rotation within the range of first and second rotation guide holes 67, 68 about the pivot 60 as the center of rotation, with the pivot 60 being engaged in the bearing hole 59 in the main tray 17 and with the first and second engagement protrusions 63, 64 engaged in arcuate first and second rotation guide holes 67, 68 formed in the main tray 17, as shown in FIG. 10. In addition, the engagement plate 61 is biased into rotation by the tension spring 62 provided between the spring retention hole 66 and a spring retention piece 69 formed in the main tray 17, as indicated by arrow E in FIGS. 10 and 13, about the pivot 60 as the center of rotation.

Figure 17:
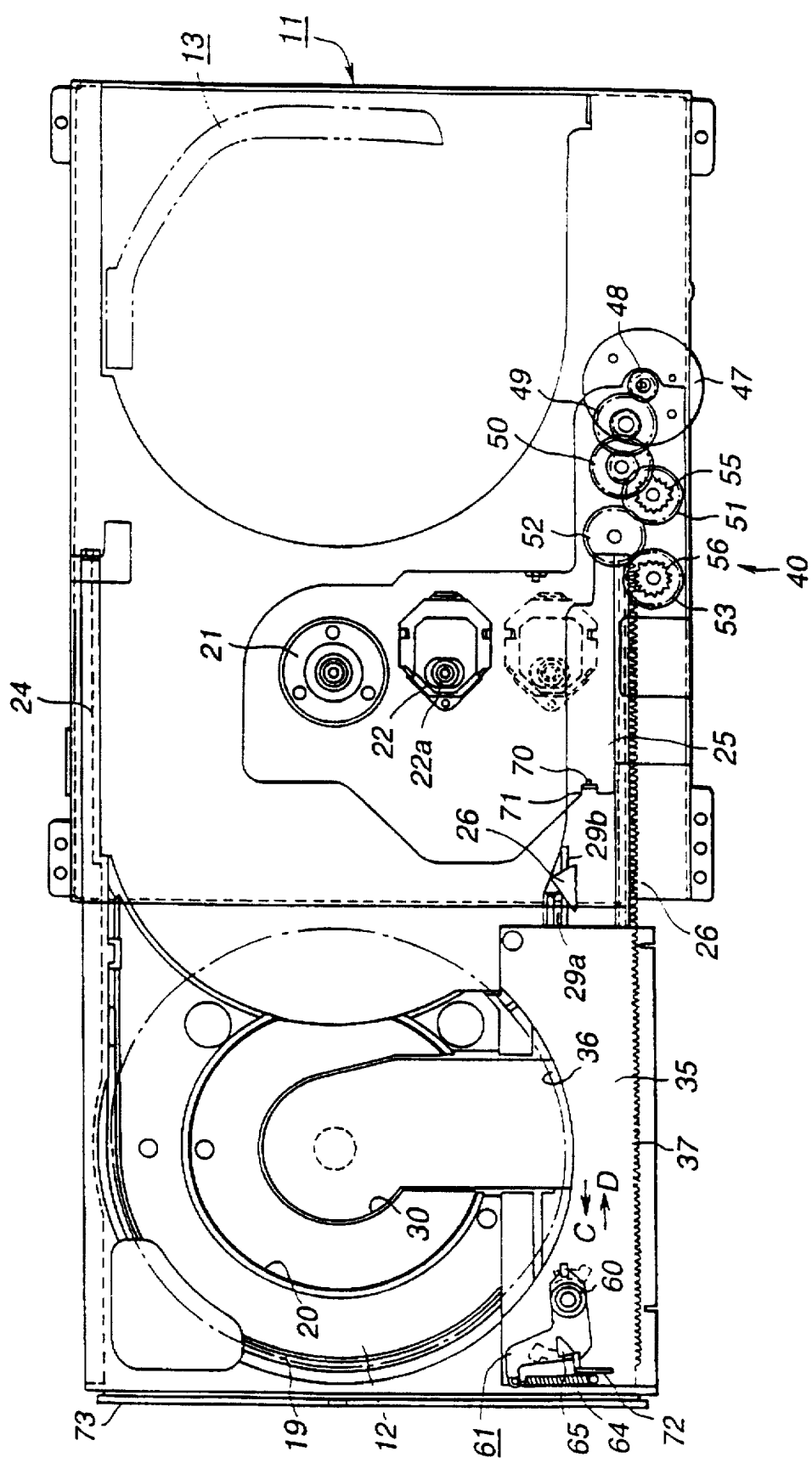
FIG. 17 is a plan view showing the state in which the main tray has been moved to a first position in which the main tray has been protruded out of the main body by the tray transfer mechanism.
Figure 18:
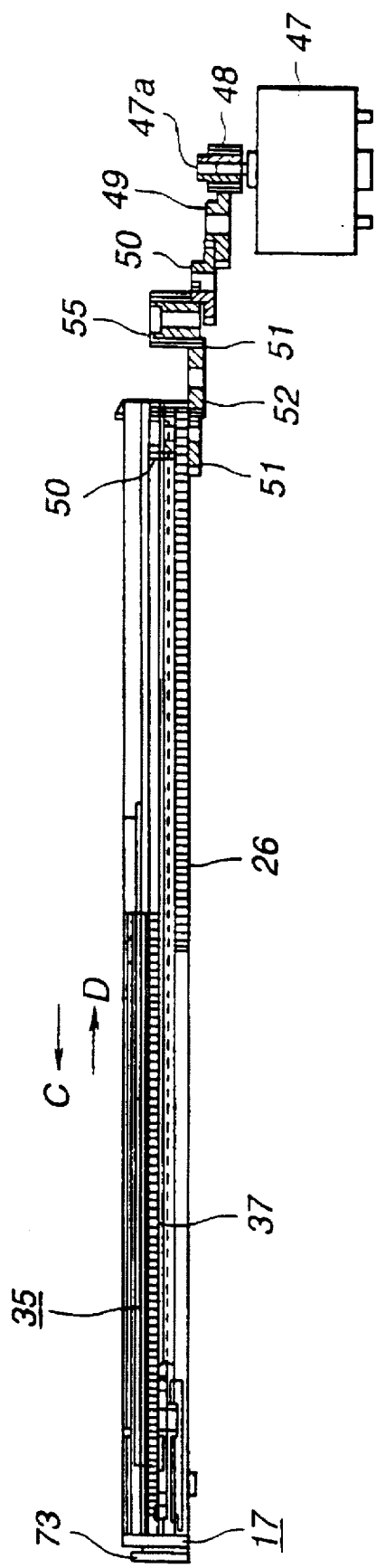
FIG. 18 is a cross-sectional side view showing the state in which the main tray has been moved by the tray transfer mechanism.

When the main tray 17 arranged on the chassis 11 is at the position shown in FIGS. 17 and 18 in which it is moved to a forward portion of the chassis 1 so as to be protruded out of the main body of the apparatus, the tray movement mechanism 46 has only the second pinion gear 56 formed on the upper end of the fifth gear 53 engaged with the first rack gear 26 of the main tray 17. When the main tray 17 has been moved to the first position in which it is protruded from the main body of the apparatus, a retention member 70 provided at a mid portion of the second guide arm 25 is caused to bear against an extrication proofing member 71 formed by segmenting a portion of the chassis 11 for restricting the movement of the main tray in a direction of being extricated from the main body of the apparatus as shown by arrow A in FIG. 17.

When the main tray 17 is at the first position, the optical disc 12 or 12a may be inserted into or ejected from the first or second setting portions 19, 20, respectively.

Figure 19:
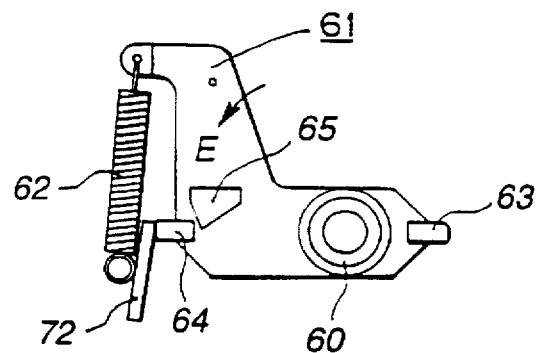
FIG. 19 is a plan view showing the state in which the transfer section has been locked by the main tray positioning mechanism.

When the main tray 17 is at the first position, the transfer section 35 constituting the transfer mechanism is at a lateral side of the first setting portion 19 formed in the tray main member 18 in which the optical disc 12 has been pulled out, and is locked to the main tray 17 by the main tray positioning mechanism 58. That is, the second engagement protrusion 64 of the engagement plate 61 protruded on the upper surface of the main tray 17 via the second rotation guide hole 68 is engaged with a retention lug 72 in the form of a thin sheet mounted on the lower surface of the transfer section 35, as shown in FIG. 19, for restricting the movement of the transfer section 35 towards the housing section 13 as indicated by arrow D in FIG. 17. The distal end of the transfer section 35 is caused to bear against a front wall 73 formed on the distal end of the main tray 17 for restricting the movement of the transfer section 35 towards the forward side of the main tray 17 as indicated by arrow C in FIG. 17.

When the driving motor 47 is driven in reverse, with the main tray 17 being at the first position of being protruded out of the main body of the apparatus, as shown in FIGS. 17 and 18, the gearing for transmitting the driving power of the driving motor 47 to the main tray 17 is rotated for causing clockwise rotation of the fifth gear 53 constituting the gearing in FIG. 17. The driving power of the driving motor 47 is transmitted to the first rack gear 26 via the second pinion gear 56 provided on the fifth gear 53, so that the main tray 17 is moved towards the housing section 13 so as to be intruded into the inside of the main body of the apparatus as indicated by arrow D in FIG. 17. When the main tray 17 starts to be moved in the direction of arrow D in FIG. 17, the first pinion gear 55 provided on the third gear 51 meshes with the first rack gear 26 of the main tray 17. When the main tray 17 is moved further in the direction of arrow D in FIG. 17, the first and second pinions 55, 56 are engaged with the second rack gear 37 provided on the transfer section 35 on the main tray 17.

Just before the main tray 17 reaches the second position proximate to the housing section 13 in the main body of the apparatus, the engagement/disengagement piece 65 provided on the engagement plate 61 constituting the main tray positioning mechanism 58 is caused to bear against the first cam surface 29a of the cam plate 29 provided on the chassis 11, as shown in FIG. 10. When the main tray 17 is further moved in a direction approaching the housing section 13 as indicated by arrow B in FIG. 10, the engagement/disengagement piece 65 rides on the first inclined cam surface 29a of the cam plate 29 such that the engagement plate 61 is rotated about the pivot 60 as the center of rotation, against the bias of the tension spring 62, as indicated by arrow E in FIG. 10. When the main tray 17 is slightly moved in the direction indicated by arrow B in FIG. 10, beginning from the state in which the engagement/disengagement piece 65 rides on the first inclined cam surface 29a, and reaches the first position in the main body of the apparatus in which the main tray is proximate to the housing section 13, the engagement/disengagement piece 65 rides over the first inclined cam surface 29a so as to be rotated under the bias of the tension spring 62 in the direction shown by arrow E in FIG. 13 until reaching the second inclined can surface 29b which has an opposite gradient to that of the first inclined cam surface 29a.

Figure 13:
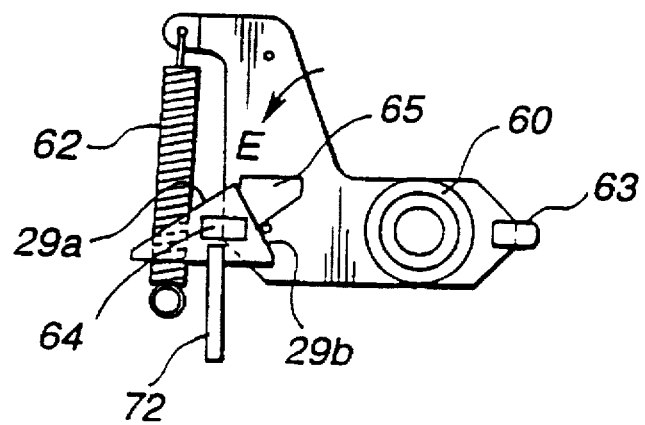
FIG. 13 is a plan view showing the main tray positioning mechanism.

The main tray 17 on reaching the first position is restricted as to its movement towards the housing section 13 as indicated by arrow B in FIG. 10, so that the engagement plate 61 is restricted as to rotation indicated by arrow E in FIG. 13 when at a position in which the engagement/disengagement piece 65 is caused to bear against a mid portion of the second inclined cam surface 29b under the bias of the tension spring 62. The relative engagement between the second engagement protrusion 64 and the retention lug 72 on the transfer section 35 is released at this time so that the transfer section 35 is enabled to be moved in the optical disc take-out direction as indicated by arrow D in FIG. 10.

The first inclined cam surface 29a provided on the cam plate 29 is formed as an inclined surface having a moderate slope in the direction of causing the engagement plate 61 to be rotated against the bias of the tension spring 62. On the contrary, the second inclined cam surface 29b is formed as a steeply inclined surface in a direction of allowing the engagement piece 61 to be rotated under the bias of the tension spring 62. Thus, by the engagement plate 61 being rotated under the bias of the tension spring 62 as indicated by arrow E in FIG. 13 for pressing the engagement/disengagement piece 65 against the mid-portion of the inclined cam surface 29b, the main tray 17 having the engagement plate 61 mounted thereon is restricted as to its movement towards the first position in which the main tray is protruded out of the main body of the apparatus. Thus, the main tray is set at the second position of being housed within the main body of the apparatus.

When the main tray 17 is at the first position proximate to the housing section 13, the first and second pinion gears 55, 56 are engaged with the second rack gear 37 of the transfer section 35 but are not engaged with the first gear 26 of the main tray 17. Thus, when the main tray 17 has been moved to the first position, the driving power of the driving motor 47 ceases to be transmitted to the main tray 47 so that it cannot be moved towards the inside of the main body of the apparatus.

Figure 14:
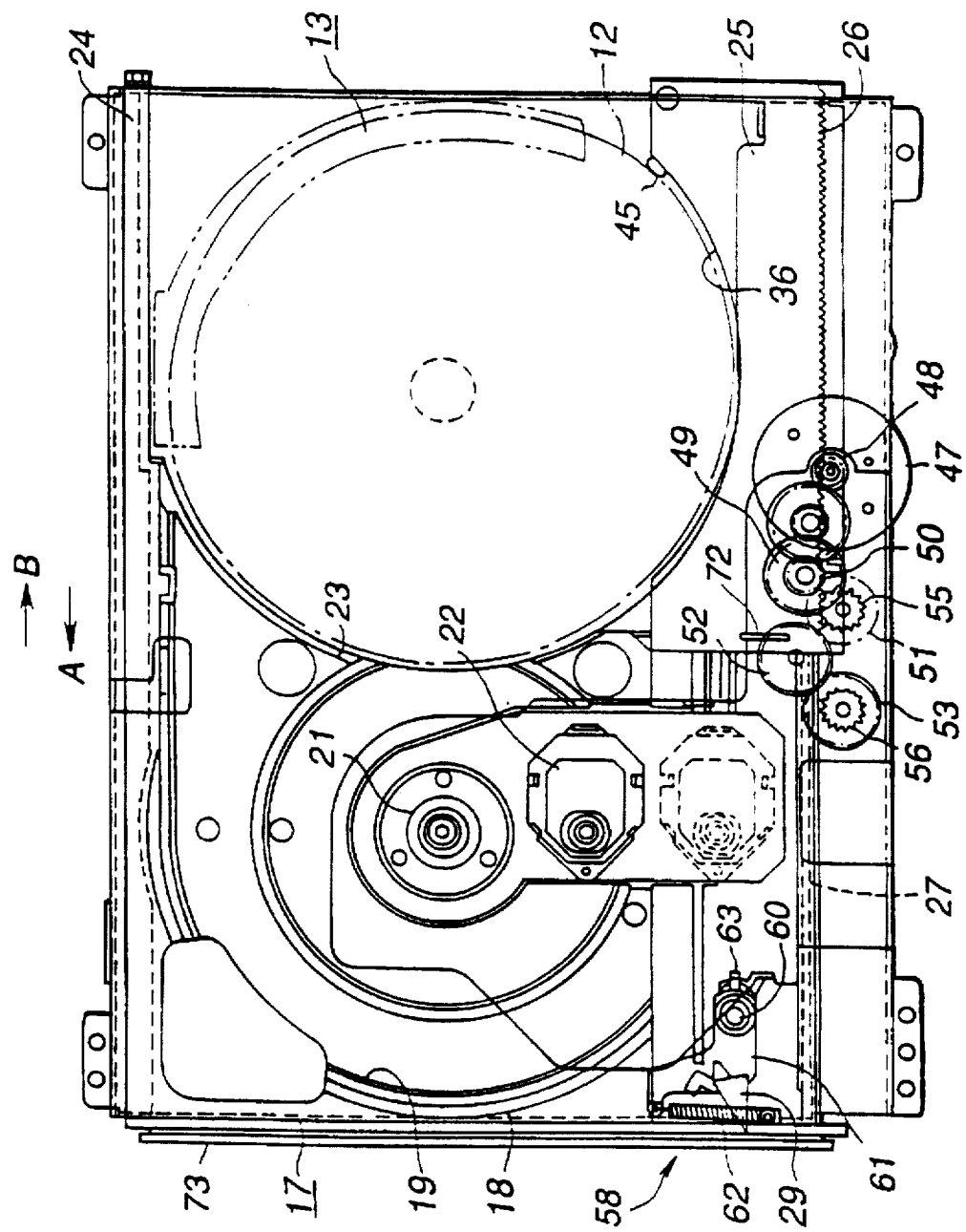
FIG. 14 is a plan view of the disc recording and/or reproducing apparatus for illustrating the main tray positioning mechanism with the transfer section having been moved to a take-out position.
Figure 15:
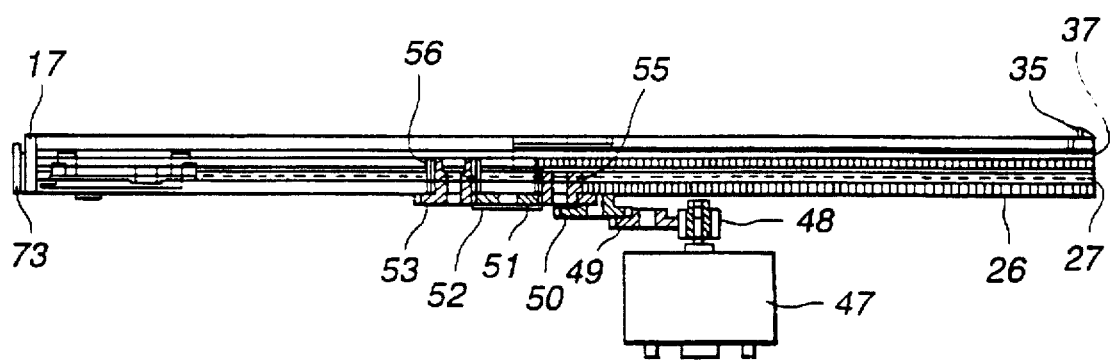
FIG. 15 is a cross-sectional side view of the disc recording and/or reproducing apparatus for illustrating the main tray positioning mechanism with the transfer section having been moved to a take-out position.

For moving the transfer section 35 on the main tray 17 in the direction of housing the optical disc 12 in the housing section 13 following the movement of the main tray 17 to its first position, the driving motor 47 is driven in reverse, as in the case of shifting the main tray 17 into the main body of the apparatus as indicated by arrow B in FIG. 10. When the driving motor 47 is driven in reverse, the driving power of the driving motor 47 is transmitted to the second rack gear 37 via the first and second pinion gears 55, 56, so that the transfer section 35 is moved towards the position laterally of the housing section 13 for housing the optical disc 12 as indicated by arrow D in FIG. 10. This movement of the transfer section is guided by the slide guide groove 43 and the guide rail 40 provided on the main tray 17. When the transfer section 35 reaches the housing position disposed laterally of the housing section 13, the driving of the driving motor 47 ceases so that the transfer section 35 is set at the housing position shown in FIG. 14.

In order to move the transfer section 35, thus moved to the housing position, to the optical disc take-out position laterally of the first and second setting portions 19, 20 of the tray main member 18, the driving motor 47 is driven forwardly. When the driving motor 47 is driven forwardly, the transfer section 35 is guided by the guide rail 40 and by the slide guide groove 43 so as to be moved as indicated by arrow C in FIG. 14. When reaching the take-out position laterally of the first and second setting portions 19, 20, the driving of the driving motor 47 ceases, so that the transfer section 35 is returned to the take-out position as shown in FIG. 10.

In order to move the main tray 17, from the first position of within the main body of the apparatus, to the second position wherein it extends out of the main body of the apparatus, the driving motor 47 is driven forwardly.

Figure 16:
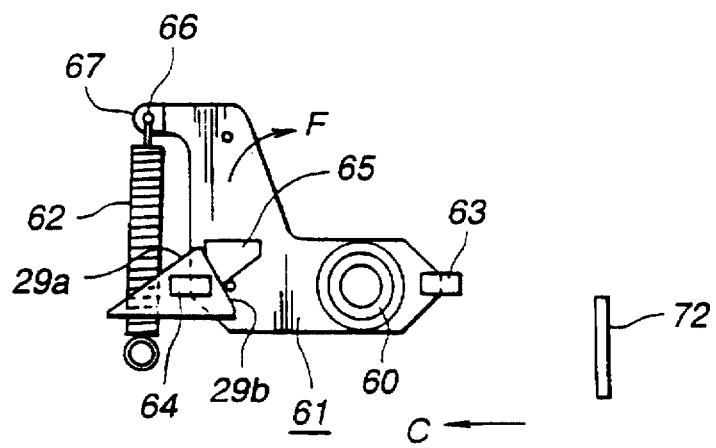
FIG. 16 is a plan view showing the state in which the main tray has been locked by the main tray positioning mechanism.

When the main tray 17 is in the first position proximate to the housing section 13, the first and second pinions 55, 56 are engaged with the second rack gear 37 provided on the transfer section 35, but are not engaged with the first rack gear 26 of the main tray 17, as shown in FIG. 11. If the driving motor 47 is driven forwardly, the transfer section 35 is moved via the first and second pinion gears 55, 56 as indicated by arrow C in FIG. 14. When the driving motor 47 is further moved forwardly after the transfer section 35 has been moved to the take-out position laterally of the first and second setting portions 19, 20, the forward end face of the transfer section 35 is caused to bear against the front wall 73 of the main tray 17 so that the transfer section 35 is unified with the main tray 17. If, after the transfer section 35 is unified with the main tray 17, the main tray 17 is moved in the direction of arrow A in FIG. 14 which is the same as the movement direction of the transfer section 35, the first pinion gear 55 meshing with the second rack gear 37 provided on the transfer section 35 is simultaneously engaged with the first rack gear 26 of the main tray 17. By the first pinion gear 55 meshing with the first rack gear 26, the driving power of the driving motor 47 is directly transmitted via the first pinion gear 55 to the main tray 17. The main tray 17 and the transfer section 35 are moved in unison by the driving motor 47 in a direction indicated by arrow A in FIG. 14. When the main tray 17 and the transfer section 35 thus unified to each other are moved in the direction as indicated by arrow A in FIG. 14, the engagement/disengagement piece 65 rides on the second inclined cam surface 29a of the cam plate 29 provided on the chassis 11 for rotating the engagement plate 61 as indicated by arrow F in FIG. 16 against the bias of the tension spring 62 about the pivot 61 as the center of rotation. With rotation of the engagement plate 61 in the direction indicated by arrow F in FIG. 16, the second engagement protrusion 64 is also moved in the same direction. When the main tray 17 and the transfer section 35, thus unified together, are moved in the direction indicated by arrow A in FIG. 14, the engagement/disengagement piece 65 rides over the second inclined cam surface 29b of the cam plate 29 to reach the first inclined cam surface 29a as indicated in FIG. 19. When the engagement/disengagement piece 65 reaches the first inclined cam surface 29a, the engagement plate 61 is rotated under the bias of the tension spring 62 as indicated by arrow E in FIG. 19. The second engagement protrusion 64 is also moved in the same direction. The second engagement protrusion 64 and the retention lug 72 of the transfer section 35, moved further forwardly from the position of the second engagement protrusion 64, are engaged at this time with each other, as shown in FIG. 19, for locking the transfer section 35 to the main tray 17.

Figure 20:
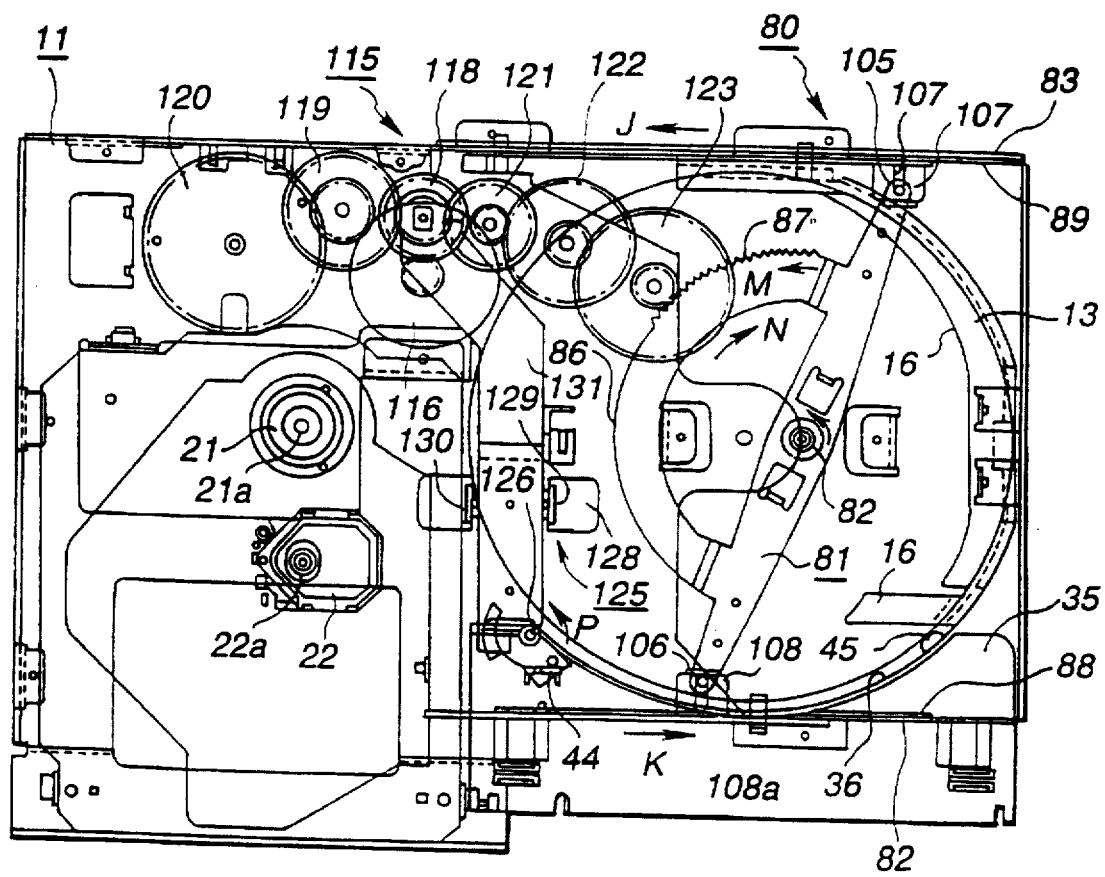
FIG. 20 is a plan view showing a main driving device, a lifting device and a driving force switching mechanism.

A lifting mechanism 80 for vertically actuating the housing section 13 on the chassis 11 in a direction perpendicular to the disc surface of the optical disc 12 housed therein as indicated by arrows G and H in FIG. 1 is arranged via the chassis 11. The lifting mechanism 80 includes a rotating plate 81 arranged on the chassis 11 for facing the lower surface of the housing section 13 and a pair of lifting plates 82, 83 slid by rotation of the rotating plate 81 for uplifting or lowering the rotating plate 81, as shown in FIG. 20. The rotating plate 81 has a rotary arm 85 pivotally mounted at its mid portion on a pivot 84 mounted upright on the chassis 11 and an arcuate gear 86 connected to one side of the rotary arm 85. The gear 86 is arcuate with the pivot 84 as the center of the arc and has a gear 87 formed on its outer peripheral surface. The first and second lifting plates 82, 83 are arranged for being superimposed on side plates 88, 89 of the chassis 11 on either sides of the housing section 13, as shown in FIGS. 21 and 22.

Figure 21:
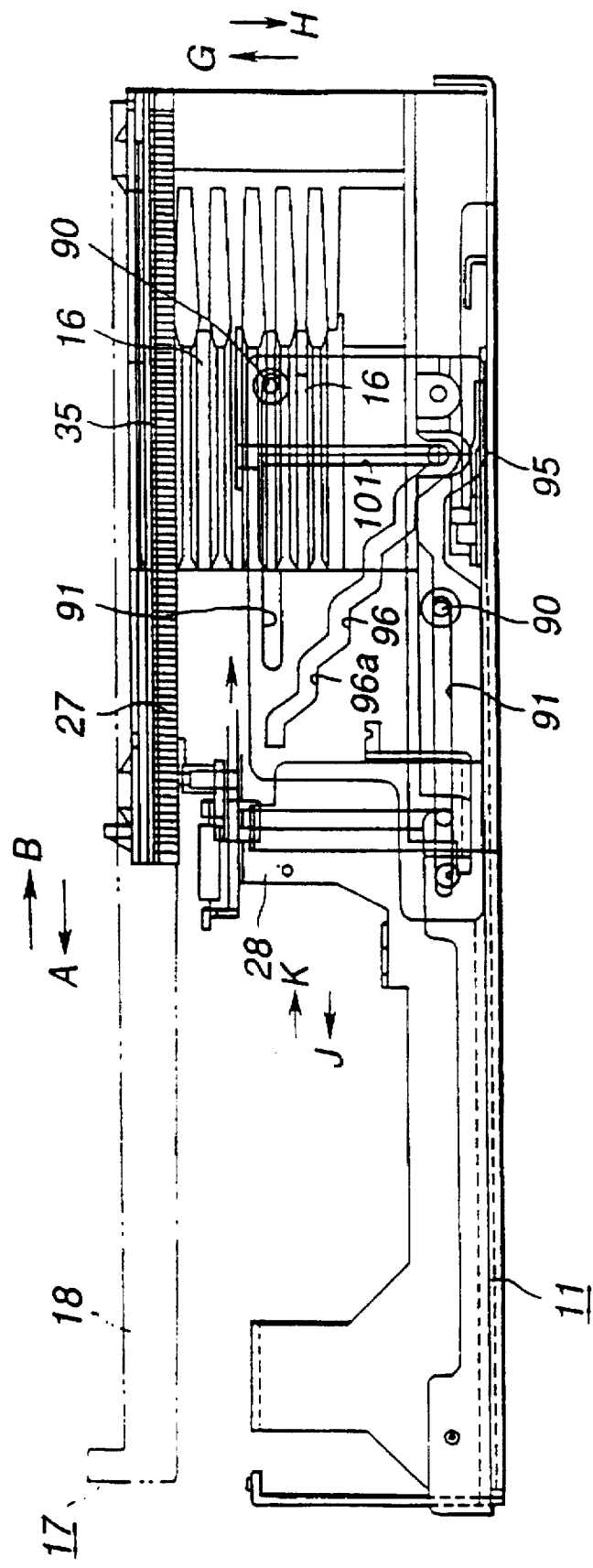
FIG. 21 is a side view showing a first lifting plate side of a lift mechanism for uplifting and lowering the housing section.
Figure 22:
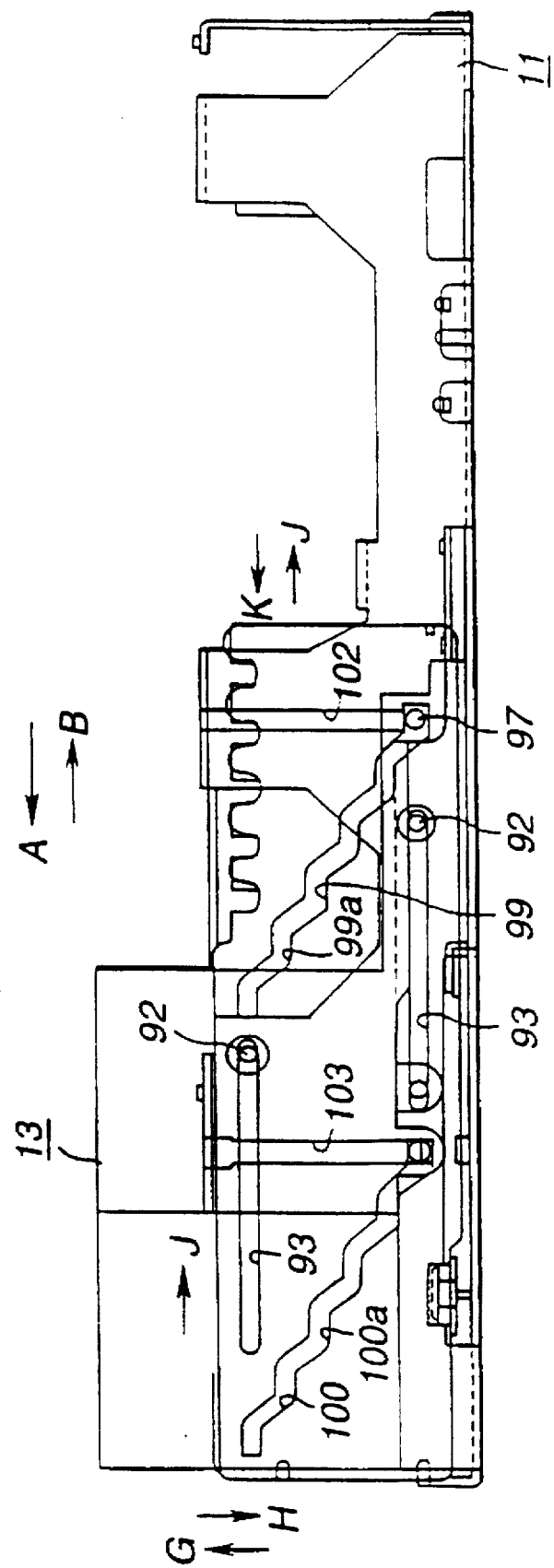
FIG. 22 is a side view showing a second lifting plate side of a lift mechanism for uplifting and lowering the housing section.

The first lifting plate 82, arranged on the side plate 88 provided with the first rack gear 26 of the main tray 17, has a pair of slide guide pins 90, 90 formed on the side plate 88 engaged in a pair of slide guide grooves 91, 91 so that the first lifting plate is guided by the slide guide pins so as to be slid in directions indicated by arrows J and K in FIGS. 20 and 21 within the extent of the slide guide grooves 91, 91. The slide guide grooves 91, 91 are elongated in shape with the longer axes thereof aligned with the direction of movement of the first lifting plate 82. The second lifting plate 83, arranged on the side plate 89, has a pair of slide guide pins 92, 92 on the side plate 89 engaged in a pair of slide guide grooves 93, 93, so that the first lifting plate is guided by the slide guide pins so as to be slid in directions indicated by arrows J and K in FIGS. 20 and 22 within the extent of the slide guide grooves 93, 93. The slide guide grooves 93, 93 are elongated in shape with the longer axes thereof aligned with the direction of movement of the second lifting plate 83.

The first lifting plate 82 is formed with a step-shaped first guide groove 96 engaged by the first lift guide pin 95 mounted on the bottom plate 14 of the housing section 13, as shown in FIG. 21. The first lift guide groove 96 has plural steps 96a progressively lower in height from the front side towards the rear side of the housing section 13. The number of these steps 96a corresponds to that of the optical discs 12 that may be accommodated within the housing section 13.

The second lifting plate 83 is formed with second and third step-shaped lift guide grooves 99, 100 engaged by guide pins 97, 98 provided on the opposite side of the bottom plate 14 of the housing section 13. These second and third lift guide grooves 99, 100 are provided with plural steps 99a, 100a progressively higher in height from the front side towards the rear side of the housing section 13 in an opposite direction to that in the first lift guide groove 96. The number of the steps 99a, 100a also corresponds to that of the optical discs 12 that may be accommodated within the housing section 13.

The first lift guide pin 95 provided on one side of the bottom plate of the housing section 13 is engaged in a vertically extending guide groove 101 formed in the side plate 88 along the height in the lifting direction of the housing section 13. The second and third lift guide pins 97, 98, formed on the opposite side of the bottom plate 14 of the housing section 13, are engaged in vertically extending guide grooves 102, 103 formed in the opposite side plate 89 along the height in the lifting direction of the housing section 13. Since the housing section 13 is supported by the first and second lifting plates 82, 83 with the lift guide pins 95, 97, 98 being engaged in the vertically extending guide grooves 102, 102, 103, the housing section is moved vertically in the uplifting/lowering direction without being moved along the sliding direction of the lifting plates 82, 83.

The lower edges of the first and second lifting plates 82, 83 are bent to form engagement pieces 107, 108 designed to be engaged with engagement pins 105, 105 formed on respective ends of the rotary arm 85 of the rotating plate 81. The first and second lifting plates 82, 83 and the rotating plate 81 are interconnected by engaging the engagement pins 105, 106 in engagement holes 107a, 108a bored in the engagement pieces 107, 108, as shown in FIG. 20. When the rotating plate 81 is rotated counterclockwise as indicated by arrow M in FIG. 20, the first lifting plate 82 is moved towards rear of the main body of the apparatus as indicated by arrow K in FIG. 21, while the second lifting plate 83 is moved towards the front side of the main body of the apparatus as indicated by arrow J in FIG. 22. When the first lifting plate 82 is moved in the direction indicated by arrow K in FIG. 21, the first lift guide pin 95 is moved in a upward direction indicated by arrow G in FIG. 21 by being guided by the first lift guide groove 96. When the second lifting plate 83 is moved in the direction indicated by arrow J in FIG. 22, the second and third lift guide pins 97, 98 are moved in the upward direction indicated by arrow G in FIG. 22 in the same amount as the amount of movement of the first lift guide pin 95 by being guided by the second lift guide grooves 99, 100. When the rotating plate 81 is rotated clockwise as indicated by arrow N in FIG. 20, the first and second lifting plates 82, 83 are moved in the opposite direction to that described above, such that the first to third lift guide ins 95, 97, 98 are moved in a downward direction as indicated by arrow H in FIGS. 21 and 22 by being guided by the first to third lift guide grooves 96, 99, 100. Thus the housing section 13, supported by the first to third lift guide grooves 96, 99, 100 via the first to third lift guide pins 95, 97, 98, is lifted in a vertical direction as indicated by arrows G or H in FIGS. 21 and 22 in an amount corresponding to the amount of rotation of the rotating plate 81.

The disc recording and/or reproducing apparatus of the present embodiment includes, via a chassis 11, a disc rotating mechanism having sa disc table 21 and a recording/ reproducing section 110 having the optical pickup 22. The recording/ reproducing section 110 is arranged on the chassis 11 so that, when the main tray 17 is at the second position corresponding to the recording/reproducing position for recording or reproducing the information on or from the optical disc 12 or 12a housed within the main body of the apparatus shown in FIG. 9, an objective lens, not shown, of the optical pickup 22 and the disc table 21 face the aperture 30 formed in the bottom sides of the first and second setting portions 19, 20 formed in the main tray 17. The recording/ reproducing section 110 is supported on the chassis 11 for movement in the direction towards and away from the main tray 17. For recording and/or reproducing the information on or from the optical disc 12 or 12a set on the first or second setting portions 19, 20, the recording/reproducing section 110 is moved from a lower position towards an upper position for approaching to the main tray 17 for protruding the disc table 21 into the inside of the first and second setting portions 19, 20 via the aperture 30. When the disc table 21 is protruded into the aperture 30, the optical disc 12 or 12a, set in position on the first or second setting portion 19, 20, has its center opening 12b engaged with a centering member 21a reciprocatingly mounted at a mid portion of the disc table 21 for centering so as to be loaded on the disc table 21. When loaded on the disc table 21, the optical disc 12 or 12a is floated from the setting surfaces 19a or 20a.

On the upper surface of the chassis 11 is arranged a clamper frame 111 facing the disc table 21, as shown in FIG. 1. A clamper arm 113 rotatably supporting a disc clamper 112 at its distal end is mounted via the clamper frame 111. The clamper arm 113 is rotatably supported by the clamper frame 111 for rotation in a direction of bringing the end-side disc clamper 112 towards and away from the disc table 21, while biasing the disc clamper 112 in a direction towards the disc table 21. Since the optical disc 12 or 12a, set on the first or second setting portion 19, 20, is loaded on the disc table 21 by the disc table 21 being protruded into the aperture 30, the optical disc 12 or 12a is pressed against the disc clamper 112 when the disc is loaded on the disc table 21. The optical disc 12 or 12a, loaded on the disc table 21, is clamped between the disc table 21 and the disc clamper 112, so as to be rotated in unison with the disc table 21 and the disc clamper 112. For recording or reproducing information signals on or from the optical disc 12 or 12a, the optical disc 12 or 12a is set on the disc table 21 and the disc table 21 is rotated for rotating the optical disc 12 or 12a. Simultaneously, the optical pickup 22 is moved from the inner rim towards the outer rim of the optical disc 12 or 12a for radiating a light beam to the disc surface.

The lifting mechanism 80 for uplifting or lowering the housing section 13 and the recording/reproducing section 110 configured to be moved towards and away from the main tray 17 may be selectively moved by a common main driving device 115. The main driving device 115 includes a sole driving motor 116 mounted on the lower surface of the chassis 11 and a gearing for transmitting the driving power of the driving motor 116 to a movement mechanism for moving the lifting mechanism 80 or the recording/ reproducing section 110 in a direction towards and away from the man tray 17, as shown in FIG. 20. The main components of the gearing include a changeover gear 118 meshing with an output gear 117 mounted on an output shaft of the driving motor 116 for switching and transmitting the driving power of the driving motor 116, first and second gears 119, 120 for transmitting the power of rotation of the changeover gear 118 towards the recording/reproducing section 110 and third to fifth gears 121, 122 and 123 for transmitting the power of rotation of the changeover gear 118 to the rotating plate 81 of the lifting mechanism 80.

The driving power of the driving motor 116 constituting the main driving device 115 is changed over by a driving power switching mechanism 125 so as to be selectively transmitted to the lifting mechanism 80 or the recording/ reproducing section 110. The driving power switching mechanism 125 lifts and lowers the changeover gear 118 in conjunction with the movement of the transfer section 35 constituting the transfer mechanism for selectively transmitting the driving power of the driving motor 116 to the lifting mechanism 80 or the recording/reproducing section 110.

The driving power switching mechanism 125 includes a rotating member 127 thrust by a slide guide piece 44 mounted on the lower surface of the transfer section 35 when the transfer section 35 has been moved to the housing position, disposed laterally of thee housing section 13, for housing the optical disc 12 therein. Thus, the rotating member 127 is rotated in a direction indicated by arrow P in FIG. 20 about a pivot 126 mounted on the chassis 11 as the center of rotation. The driving power switching mechanism also includes an oscillating plate 131 having at its mid portion a pair of rotation supporting pieces 130, 130 pivotally mounted by a pivot 129 mounted across a pair of supporting pieces 128, 128 formed by segmenting a part of the chassis 11. Thus, the oscillating plate 131 may be rotationally deflected, about the pivot 129 as the center of rotation, so that its left and right ends are moved towards and away from the chassis 11.

Figure 23:
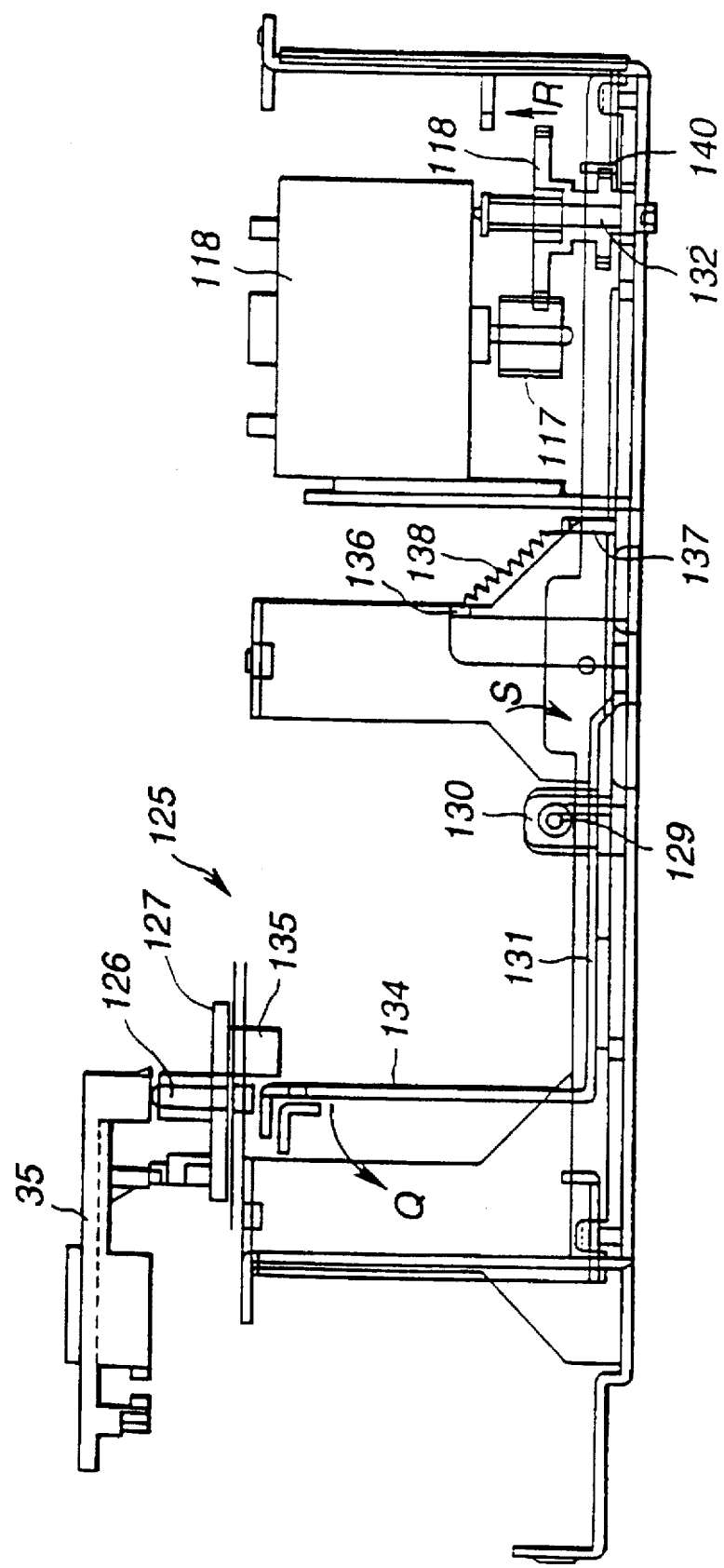
FIG. 23 is a side view showing a driving force switching mechanism.

The right-side end of the oscillating plate 131 in FIG. 23 is a gear shifting section 133 abutted against the changeover gear 118 for shifting the changeover gear along the axis of the pivot 132. The pivot 132 of the changeover gear 118 is mounted upright on the gear shifting section 133. The left-side end of the oscillating plate 131 in FIG. 23 is formed with an upstanding portion 134 engaged with a protrusion 135 provided on the lower portion of the rotating member 127. The oscillating plate 131 is biased by a tension spring 138 mounted between a spring retention piece 136 formed upright on its one end and a spring retention piece 137 formed on the chassis 11 into rotation in a direction of lowering the gear shifting section 133 as indicated by arrow S in FIG. 23.

Figure 25:
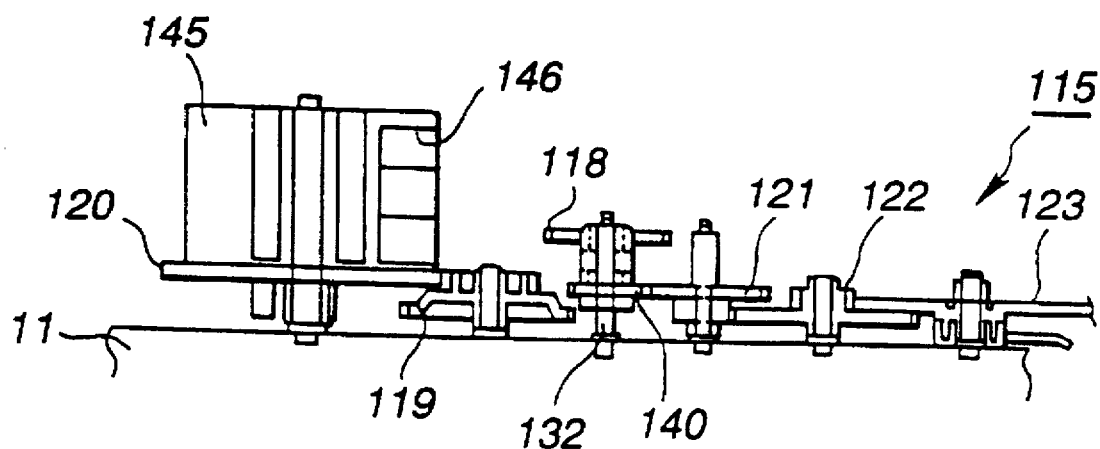
FIG. 25 is a side view showing the driving force switching mechanism with the driving force being transmitted to the lift mechanism of the housing section.

When the transfer section 35 is moved to the housing position in which the transfer section 35 is located laterally of the housing section 13, the driving power switching mechanism 125 has its rotating member 127 thrust by the slide guide piece 44 mounted on the lower surface of the transfer section 35 so as to be rotated as indicated by arrow P in FIG. 20. When the rotating member 127 is rotated in a direction indicated by arrow P in FIG. 20, the protrusion 135 mounted on the rotating member 127 thrusts the upstanding portion 134 of the oscillating plate 134 for rotating the oscillating plate 131 against the bias of the tension spring 138 about the pivot 129 as the center of rotation as indicated by arrow Q in FIG. 23. When rotated in a direction indicated by arrow Q in FIG. 23, the gear shifting section 133 on one end of the oscillating late 131 is lifted for shifting the changeover gear 118 in a direction indicated by arrow R in FIG. 23. When the changeover gear 118 is moved in the direction indicated by arrow R in FIG. 23, the small gear 140 mounted on the pivot 132 in unison with the changeover gear 118 meshes with the third gear 121, as shown in FIG. 25, for transmitting the driving power of the driving motor 118 to the rotating plate 81 of the lifting mechanism 80 via the changeover gear 118, third gear 121, fourth gear 122 and the fifth gear 123. When the driving motor 118 is driven forwardly or in reverse, the rotating plate 118 is rotated forwardly or in reverse for lifting or lowering the housing section 13.

Figure 24:
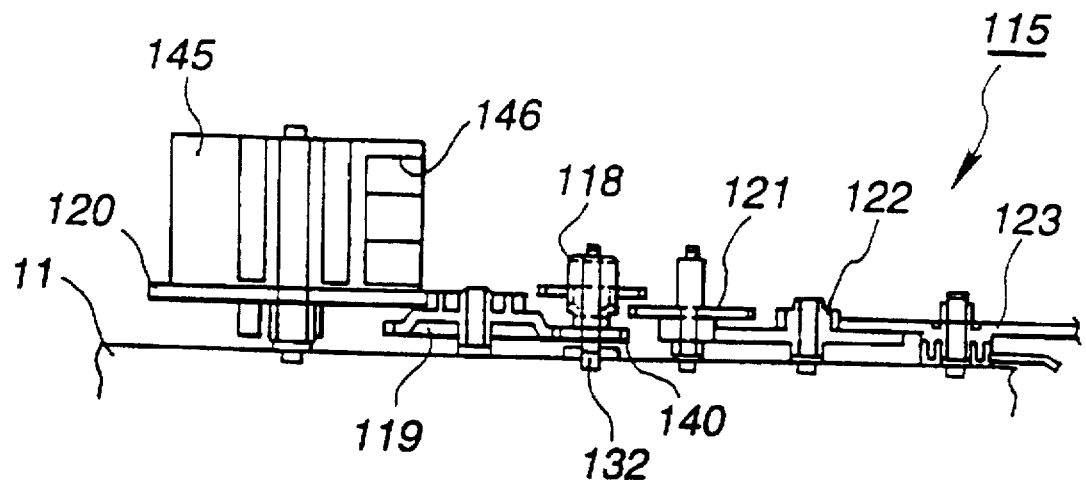
FIG. 24 is a side view showing a driving force switching mechanism with the driving force being transmitted to the recording/reproducing section.

When the transfer section 35 is not at the housing position, the driving power switching mechanism 125 does not have its rotating member 127 thrust by the transfer section 35. Thus, the oscillating plate 131 is rotationally biased by the tension spring 138 in a direction indicated by arrow S in FIG. 23 in which the gear shifting section 133 on one end of the oscillating plate 131 is lowered under the bias of the tension spring 138. Thus, the changeover gear 118 has been moved in a direction opposite to that shown by arrow R in FIG. 23. Thus, the small gear 140 integral with the changeover gear 118 meshes with the first gear 119 as shown in FIG. 24 for transmitting the driving power of the driving motor 118 towards the recording/reproducing section 110 via the changeover gear 118 and the first and second gears 119, 120.

Figure 26:
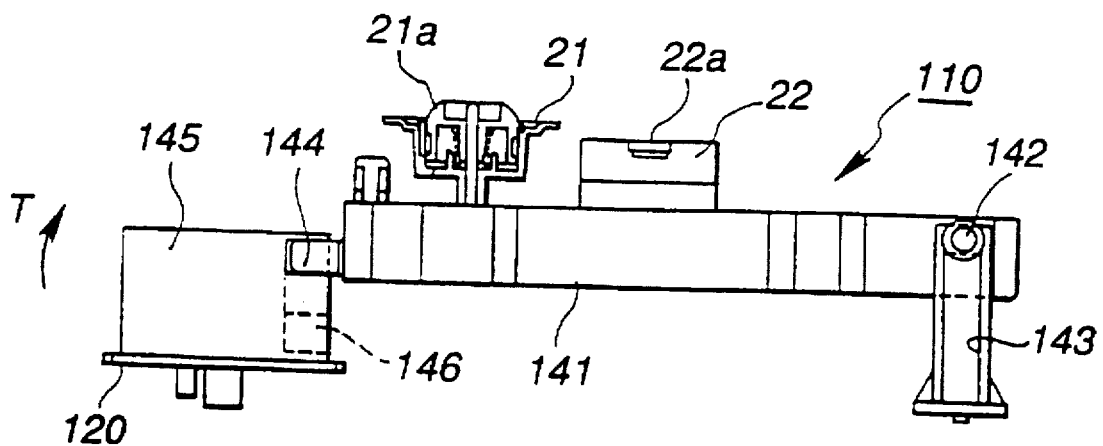
FIG. 26 is a side view showing the recording/reproducing section having been raised towards the main tray side.
Figure 27:
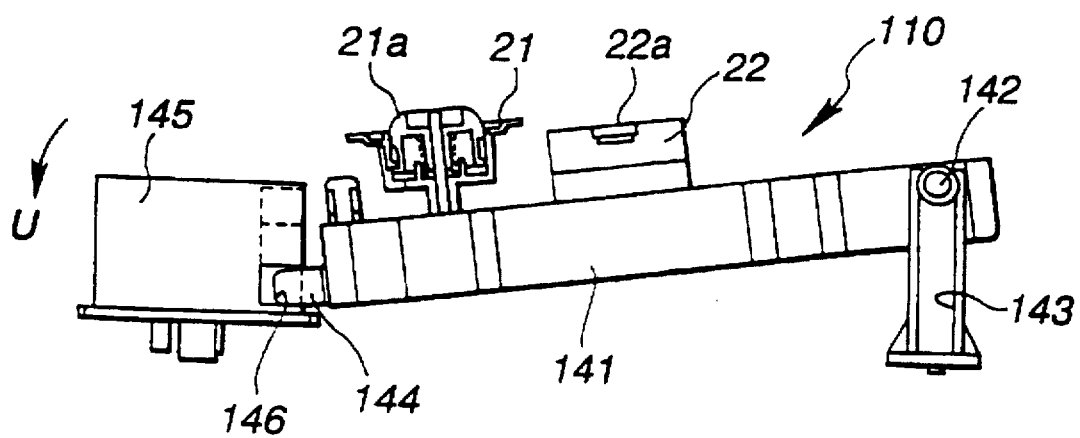
FIG. 27 is a side view showing the state in which the recording/reproducing unit has been moved towards a lower side away from the main tray.

The recording/reproducing section 110 has a supporting member 141 supporting the disc rotating mechanism inclusive of the disc table 21, the optical pickup 22 and the pickup mechanism for feeding the optical pickup, as shown in FIGS. 26 and 27. A supporting shaft 142 mounted on the proximal end of the supporting member 141 opposite to the disc table 21 is supported by a supporting column 143 mounted upright on the chassis 11 so that the recording/ reproducing section 110 may be rotated about the supporting shaft 142 as the center of rotation in a direction approaching the main tray 17 indicated by arrow T in FIG. 26 and in a direction away from the main tray 17 as indicated by arrow U in FIG. 27. The distal end of the supporting member 141 carries a lift guide pin 144. The lift guide pin 144 is engaged in a cam groove 146 formed on the outer peripheral surface of a cylindrical cam 145 mounted on the second gear 120 for rotation in unison with the gear 120. By rotation of the second gear 120 and the cam member 145 in unison with the second gear 120, the lift guide pin 144 is guided in the vertical directions, so that the recording/reproducing section 110 is rotated about the pivot 142 as the center of rotation in a direction of approaching the main tray 17 as indicated by arrow T in FIG. 26 and in a direction away from the main tray 17 as indicated by arrow U in FIG. 27.

The operation of the above-described disc recording/ reproducing apparatus of the present embodiment in selectively and sequentially loading the optical disc 12 housed within the housing section 13 on the recording/reproducing section 110 for recording and/or reproducing the information is hereinafter explained.

For loading the optical disc 12 housed within the housing section 13 on the recording/reproducing section 110 for recording and/or reproducing the information, the tray movement mechanism 46 is actuated for shifting the main tray 17 to the first position in FIG. 9 of enabling information recording and/or reproduction on or from the optical disc 12 housed within the main body of the apparatus. At this time, the optical disc 12 or 12a is not set in the first or second setting portions 19, 20 of the main tray 17. The transfer section 35 movably mounted on the main tray 17 has been moved to the housing position in the housing section 13. The oscillating plate 131 has its rotating member 127 rotated at this time by the transfer section 35 against the bias of the tension spring 138 so that the changeover gear 118 is engaged with the third gear 121 to permit the driving power of the driving motor 118 to be transmitted to the rotating plate 81 of the lifting mechanism 80.

It is now supposed that the third one of the optical discs 12 housed within the housing section 13 is loaded on the recording/reproducing section 110 for information reproduction.

Figure 28:
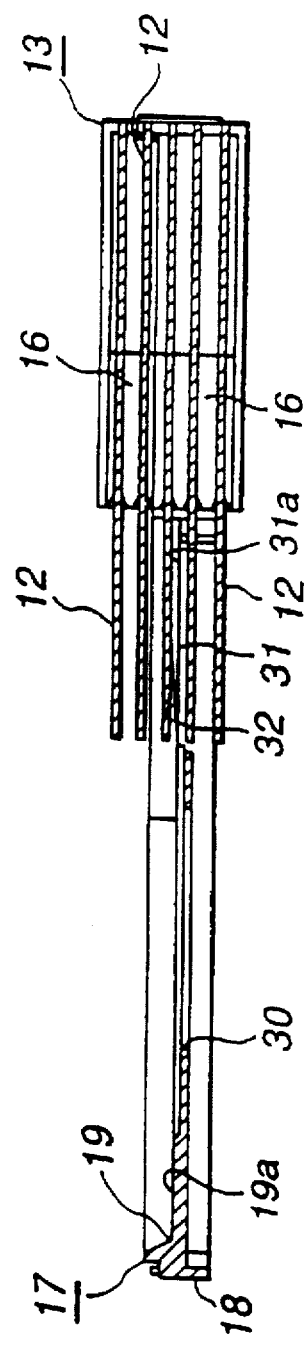
FIG. 28 is a cross-sectional side view showing the relative disposition between the housing section and the main tray.

With the state shown in FIG. 9 as the initial position, the driving motor 116 of the main driving device 115 is actuated for lifting the housing section 13. The disc supporting surface 16a of the disc supporting piece 16 supporting the third optical disc 12 in the housing section 13, as counted from the upper most disc, is brought into coincidence with a rear side upper surface 31a of the guide portion 31 of the main tray 17 which is at a position higher than Ah than a disc setting surface 19a of the first setting portion 19, as shown in FIG. 28. The driving motor 47 of the tray movement mechanism 46 is driven forwardly for moving the transfer section 35 in the housing position towards the take-out position disposed at the first setting portion 19. At this time, the disc supporting lug 45 mounted upright on the disc guide portion 36 of the transfer section 35 supports the rear outer rim of the third uppermost optical disc 12 in the housing section 13 which is in a recessed area of the housing section 13, while the disc guide portion 36 thrusts the rear side outer rim of the optical disc 12. By movement of the transfer section 35 in a direction indicated by arrow C in FIGS. 10 and 14, the optical disc 12 disposed within the housing section 13 is transferred towards the first setting portion 19 along with the transfer section 35.

Figure 29:
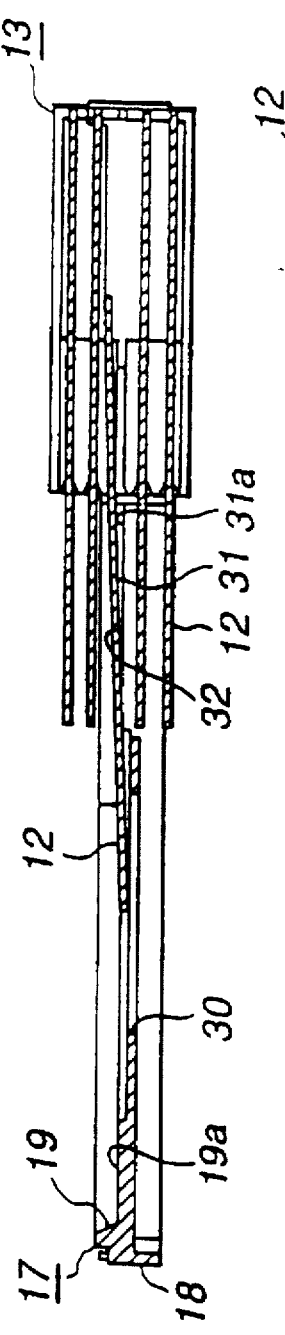
FIG. 29 is a cross-sectional side view showing an optical disc being taken out of the housing section.
Figure 30:
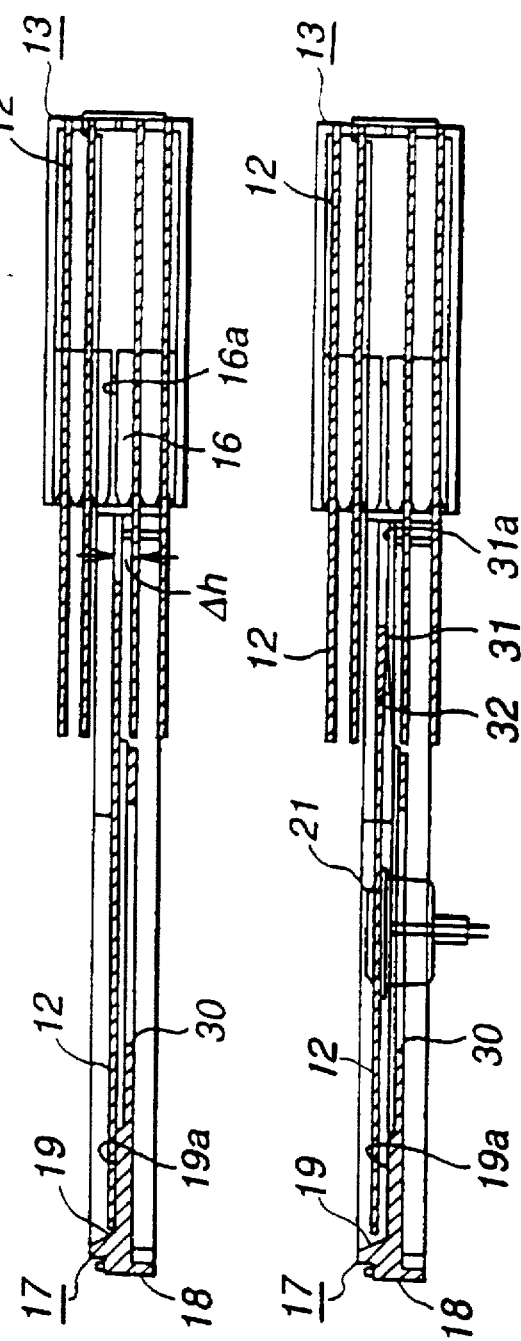
FIG. 30 is a cross-sectional side view showing an optical disc having been set on a first setting section of the main tray.

When taken out of the housing section 13 so as to be transferred towards the first setting portion 19, the optical disc 12 slides on the rear side upper surface 31a of the guide portion 31 which is higher in level by Δh than the disc setting surface 19a of the first setting portion 19, as shown in FIG. 29. The optical disc 12 is then guided by the inclined surface 32 and transferred in the manner of descending onto the disc setting surface 19a of the first setting portion 19. When the transfer section 35 is moved as far as the take-out position disposed laterally of the first setting portion 19, the optical disc 12 is set on the disc setting surface 19a of the first setting portion 19.

Figure 31:
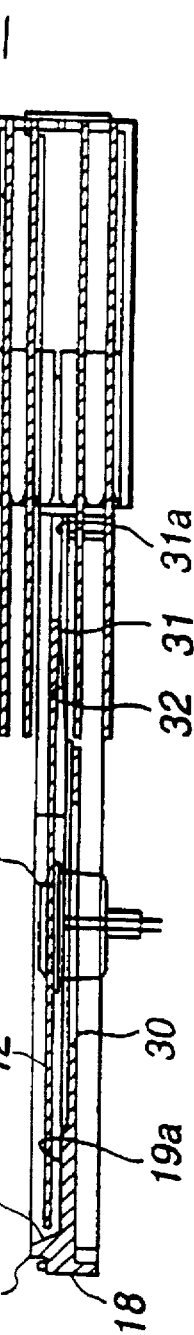
FIG. 31 is a cross-sectional side view showing an optical disc having been set on a disc table.
Figure 32:
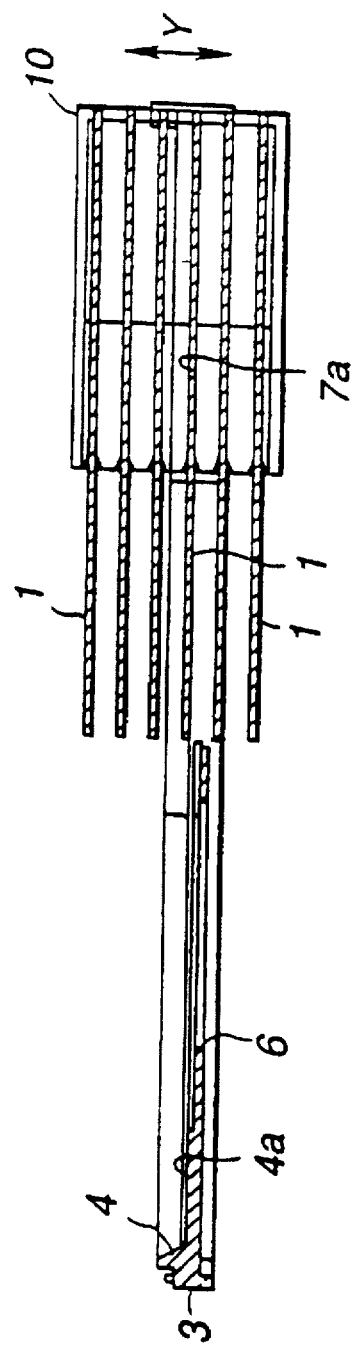
FIG. 32 is a cross-sectional side view showing the relative disposition between the housing section and the main tray in a disc recording and/or reproducing apparatus previous to the present invention.
Figure 33:
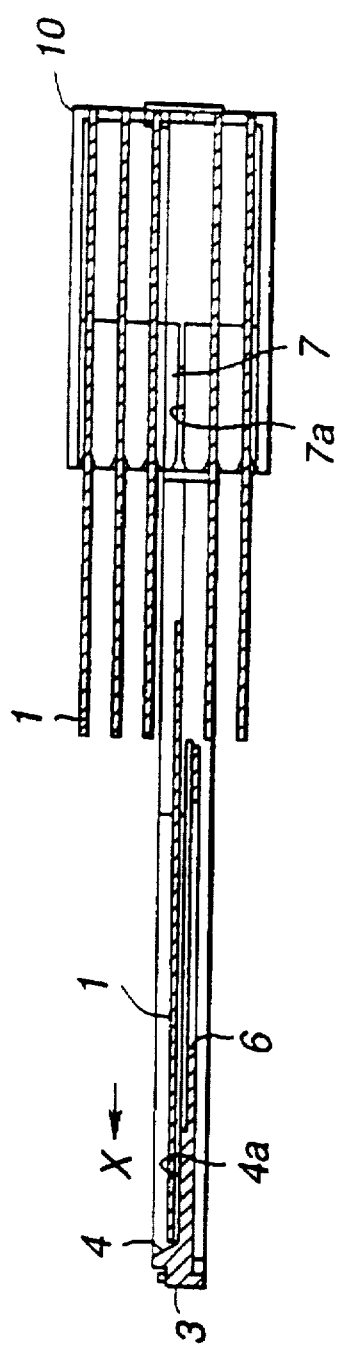
FIG. 33 is a cross-sectional side view showing an optical disc being taken out of the housing section in the disc recording and/or reproducing apparatus shown in FIG. 32.
Figure 34:
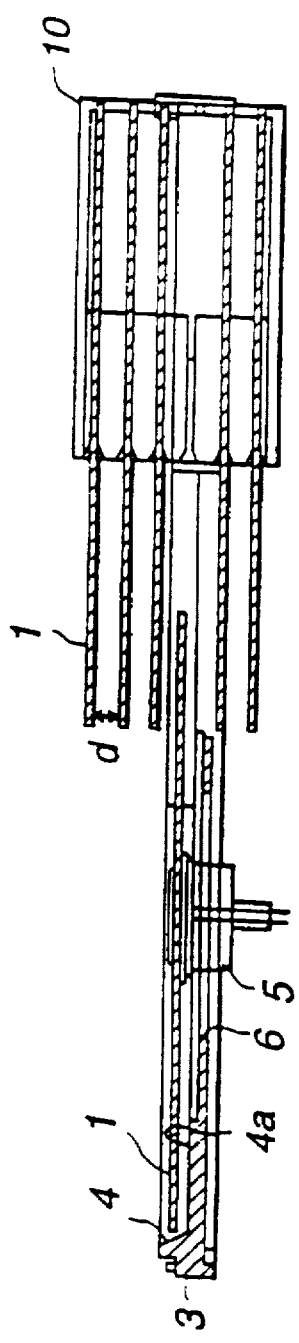
FIG. 34 is a cross-sectional side view showing an optical disc having been set on the disc table in the disc recording and/or reproducing apparatus shown in FIG. 32.

When the transfer section 35 is moved as far as the take-out position, the oscillating plate 131 of the driving portion switching mechanism 125 is rotated under the bias of the tension spring 138. The changeover gear 118 meshes with the first gear 119 so that the driving power of the driving motor 118 is transmitted via the first and second gears 119, 120 to the recording/reproducing section 110. If the driving motor 116 of the main driving device 115 is now driven to rotate the cylindrical cam member 145 for moving the recording/reproducing section 110 towards the main tray 17, with the disc table 21 being, protruded via the aperture 30 into the inside of the first setting portion 19, the optical disc 12 is loaded on the disc table 21 in a manner wherein it is lifted clear of the disc setting surface 19a. The disc clamper 112 is pressed at this time against the disc table 21 for sandwiching the optical disc 12 between the disc clamper 112 and the disc table 21 for enabling the rotation of the optical the optical disc 12 in unison with the disc table 21, as shown in FIG. 31. If now the disc table 21 is rotated and the optical pickup 22 is moved across the inner and outer rims of the optical disc 12, the information may be reproduced from the optical disc 12.

For reproducing the information from an other optical disc 12 housed within the housing section 13, the recording/reproducing section 110 is moved to a lower position for returning the optical disc 12 as set on the disc table 21 onto the disc setting surface 19a of the first setting portion 19. The driving motor 47 of the tray movement mechanism 46 is driven in reverse for moving the transfer section 35 from the take-out position as far as the housing position. When the transfer section 35 is moved from the take-out position as far as the housing position, the optical disc 12 is transferred towards the housing section 13 in an opposite direction to the above-described take-out direction while the disc guide portion 36 thrusts the forward outer rim of the optical disc 12 set on the disc setting surface 19a of the first setting portion 19. When the transfer section 35 is moved as far as the housing position, the optical disc 12 is set on the original third uppermost disc supporting piece 16. After the optical disc 12 has been returned into the hoising section 13, the above-described sequence of operations is carried out for reproducing the desired other optical disc 12.

If desired to exchange the reproduced optical disc 12 with an other optical disc 12 for information reproduction therefrom, the driving motor 47 of the tray movement mechanism 46 is driven forwardly for a shorter time for transiently moving the transfer section 35 to a forward position of the main body of the apparatus as indicated by arrow C in FIG. 10, for preventing the transfer section 35 from being abutted against the optical disc 12 housed within the vertically moved housing section 13. For exchanging the optical disc 12 housed within the housing section 13, the optical disc is pulled out onto the first setting portion 19, after which the driving motor 47 of the tray movement mechanism 46 is driven forwardly for shifting the main tray 17 to its first position projected out of the main body of the apparatus. The optical disc 12 thus pulled out onto the first setting portion 19 is exchanged with an other disc. The driving motor 47 is then driven in reverse for shifting the main tray 17 to its second position within the main body of the apparatus, and the transfer section 35 is moved towards the housing section, for housing the other optical disc within the housing section 13.

On the bottom plate 14 of the housing section 13 is mounted a disc supporting shaft 151 configured to be inserted into the center opening 12b of the optical disc 12 housed within the housing section 13, as shown in FIG. 1. The supporting shaft 151 is of a height slightly smaller than the height of the disc setting surface 19a of the first disc setting portion 19 in order not to obstruct the transfer of the optical disc 12 towards and away from the first setting portion 19. An auxiliary disc supporting shaft 152 is protruded from the clamper frame 111 for facing the disc supporting shaft 151. Between the auxiliary disc supporting shaft 152 and the disc supporting shaft 151 is provided a gap larger in width than the thickness of the optical disc 12 to permit the transfer thereof. By providing the disc supporting shaft 151 and the auxiliary disc supporting shaft 152, the optical disc is 12 housed within the housing section 13 but not transferred for the time being may be prohibited from being moved along the disc surface so as to be stably housed in the housing section 13.

With the above-described disc recording and/or reproducing apparatus of the present embodiment, the disc supporting surface 16a of the disc supporting piece 16 for the optical disc 12 transferred to the main tray 17 for information recording and/or reproduction therefrom is at a position higher by the height Δh of inclined surface 32 of the guide portion 31 than the disc setting surface 19a of the first disc setting portion 19 of the main tray 17. Thus, it becomes possible to reduce the distance between the upper surface of the optical disc 12 set on the first setting portion 19 of the main tray 17 and the lower surface of the optical disc 12 disposed one tier above the disc supporting piece 16 on which the optical disc 12 now set on the setting portion 19 was originally housed. That is, if the optical disc 12 is raised in its position by the height Δh of the inclined surface 32 of the guide portion, the optical disc 12 can be prohibited from colliding against the optical disc 12 which is housed within the housing section 13 and which is partially overlapped with the optical disc set on the setting portion.

If the guide portion 31 is not provided, the housing section 13 for housing optical discs 23 with a diameter of 12 cm, has to be designed so that the interval between the optical discs 12 will be equal to 6.5 mm. In the present embodiment, the interval may be reduced to 5.0 mm, thus enabling the height of the housing section 13 to be correspondingly reduced.

In addition, by providing the main tray 17 with the guide portion 31 for allowing the optical disc 12 to be moved along the inclined surface 32, smooth transfer may be realized despite the possible presence of a step difference between the first setting portion 19 of the main tray and the housing section 13. The transfer section 35 for transferring the optical disc 12 may be simplified in construction since it suffices if the transfer section is caused to bear against a portion of the optical disc 12 for thrusting the disc. In addition, only one tray movement mechanism 46 for the tray 17 and only one transfer section 35 are sufficient, thereby reducing the size and simplifying the apparatus.

Furthermore, the driving power of the driving motor 116 of the main driving device 115 is switched and transmitted to the movement mechanism for the recording/reproducing section 110 and the lifting mechanism 125 with the aid of the driving power switching mechanism 125 when the transfer section 35 has been moved to the housing position, thus resulting in saving of the driving power of the driving source.

In the above-described embodiment, the disc supporting piece 16 of the housing section 13 is located above the disc setting surface 19a of the frost setting portion 19 of the main tray 17. It is however possible for the disc setting surface to be positioned above the disc supporting piece of the housing section depending on the direction of slightly moving the disc from the tray.

According to the present invention, the housing section for housing plural discs may be reduced in size, while the disc recording and/or reproducing apparatus employing the housing section and the disc lock mechanism may also be reduced in size.

According to the present invention, stable disc rotation may be achieved while reducing the pull-out length of the disc from the housing section.

The discs housed within the housing section may be exchanged with other discs by an operation from outside the main body of the apparatus.

We claim:

1. A disc recording and/or reproducing apparatus comprising:

a housing section housing a plurality of discs, said plurality of discs being arranged in a spaced relation with disc surfaces facing one another with a predetermined distance therebetween, said housing section being arranged within a main body of the apparatus for being vertically moved by lifting means in a direction substantially perpendicular to the disc surfaces, transfer means movable in a direction parallel to the surfaces of the discs housed within said housing section for selectively taking out a selected disc from among the plurality of discs housed within said housing section and for re-inserting the taken-out disc into said housing section, a main tray having a setting portion on which the disc taken out of the housing section by said transfer means is set, said main tray being movable in a direction parallel to the surfaces of the discs housed within said housing section between a first position protruded from the main body of the apparatus and a second position housed within the main body of the apparatus, and a recording and/or reproducing section for recording and/or reproducing the information on or from the disc set on said setting portion of the main tray moved to said second position, wherein the distance between the center of the setting portion of the main tray moved to said second position and the center of the disc housed within the housing section is selected to be shorter than the diameter of the discs housed within said housing section, and wherein the selected disc among the plurality of discs housed within the housing section which is raised or lowered by said lifting means relative to the transfer means and the main tray and which faces said transfer means is positioned at a position higher by a pre-set distance than the disc setting surface of said setting portion whereby the selected disc can be drawn out of the housing section and guided in a downwardly angled direction onto the disc setting surface in a manner which allows the selected disc to seat on the disc setting surface with the upper surface of the selected disc at a level which is lower than the lower surface of the selected disc when the selected disc is stored in the housing section, and in a manner which allows the selected disc to be lifted off the disc setting surface and raised above the disc setting surface by the predetermined distance by engagement with a selectively rotatable disc table and raised to a position above the disc setting surface wherein the selected disc can be rotated without engagement with a surface of another disc and enable the predetermined distance between the opposite surfaces of the plurality of discs to be minimized and an overall height of the housing section reduced.

2. The disc recording and/or reproducing apparatus as claimed in claim 1, wherein said transfer means has a transfer section transferring the disc facing said transfer means towards the setting portion of said main tray and a guide portion for guiding the disc transferred by said transfer section.

3. The disc recording and/or reproducing apparatus as claimed in claim 2, wherein said guide portion includes an inclined portion interconnecting the disc facing said transfer section and said setting portion.

4. The disc recording and/or reproducing apparatus as claimed in claim 2, wherein said transfer section is mounted for movement in a direction parallel to the surface of the discs housed within said housing section between a take-out position of taking out the disc housed within said housing section onto said main tray and a transfer position to which the disc taken out from said housing section is to be transferred.

5. The disc recording and/or reproducing apparatus as claimed in claim 1, further comprising movement means for moving said recording/reproducing section between a recording/reproducing position for recording and/or reproducing the information on or from the disc and position lower in level than said recording and/or reproducing position.

6. The disc recording and/or reproducing apparatus as claimed in claim 5, further comprising a sole driving source and switching means for selectively switching and transmitting the driving power of said sole driving source to said lifting means or said movement means.

7. The disc recording and/or reproducing apparatus as claimed in claim 5, wherein said switching means includes a switching member actuated by movement of said main tray from one of the first position protruded from the main body of the apparatus and a second position housed within the main body of the apparatus to the other of said positions, and a meshing portion provided in said switching member for selectively meshing with said lifting means and said movement means by actuation of said switching member by said main tray, said meshing member selectively supplying the driving power of said driving source to said lifting means and said movement means.

8. The disc recording and/or reproducing apparatus as claimed in claim 1, wherein said lifting means includes a lifting portion for raising and lowering said housing section in a direction perpendicular to the surfaces of the discs housed within said housing section and a guide portion for guiding said housing section in a direction perpendicular to the disc surface.

9. A disc loading mechanism comprising a housing section housing a plurality of discs, said discs being arranged in a spaced relation with disc surfaces facing one another with a predetermined distance therebetween, said housing section being arranged within a main body of the apparatus for being vertically moved by lifting means in a direction substantially perpendicular to the disc surfaces, transfer means movable in a direction parallel to the surfaces of the discs housed within said housing section for selectively taking out a selected disc from among the discs housed within said housing section and for re-inserting the taken-out disc in said housing section, and a main tray having a setting portion on which the disc taken out of the housing section by said transfer means can be set, said main tray being movable in a direction parallel to the surfaces of the discs housed within said housing section between a first position protruded from the main body of the apparatus and a second position housed within the main body of the apparatus, wherein the selected disc selected from among the plurality of discs housed within the housing section raised or lowered by said lifting means relative to the transfer means and the main tray which faces said transfer means, is positioned so that a lower surface of the selected disc is higher by a pre-set distance than the disc setting surface of said setting portion whereby the selected disc can be drawn out of the housing section and guided in a downwardly angled direction onto the disc setting surface in a manner which allows the selected disc to seat on the disc setting surface with the upper surface of the selected disc at a level which is lower than the lower surface of the selected disc when the disc is stored in the housing section, and in a manner which allows the disc to be lifted off the disc setting surface and raised above the disc setting surface by the predetermined distance by engagement with a selectively rotatable disc table and raised to a position above the disc setting surface wherein the disc can be rotated without engagement with a surface of another disc and enable the predetermined distance between the opposite surfaces of the plurality of discs to be minimized and an overall height of the housing section reduced.

10. The disc loading mechanism as claimed in claim 9, wherein transfer means has a transfer section for transferring a disc facing said transfer means towards a setting portion for said main tray and a guide portion for guiding the disc transferred by said transfer section.

11. The disc loading mechanism as claimed in claim 10, wherein said guide portion has an inclined portion interconnecting the disc facing said transfer means and said setting portion.

12. The disc loading mechanism as claimed in claim 10, wherein said transfer section is mounted for movement in a direction parallel to the surface of the discs housed within said housing section between a take-out position of taking out the disc housed within said housing section onto said main tray and a transfer position to which the disc taken out from said housing section is to be transferred.

13. The disc loading mechanism as claimed in claim 9, wherein the distance between the center of the setting portion for said main tray moved to said second position closer to said housing section and the center of the disc housed within said housing section is shorter than the diameter of the disc housed within said housing section.

14. The disc loading mechanism as claimed in claim 9, wherein said lifting means includes a lifting portion for uplifting and lowering said housing section in a direction perpendicular to the surfaces of the discs housed within said housing section and a guide portion for guiding said housing section in a direction perpendicular to the disc surface.

* * * * *